US011025677B2

(12) United States Patent
Cohn

(10) Patent No.: US 11,025,677 B2
(45) Date of Patent: *Jun. 1, 2021

(54) USING SYMMETRIC AND ASYMMETRIC FLOW RESPONSE PATHS FROM AN AUTONOMOUS SYSTEM

(71) Applicant: Oracle International Corporation, Redwood Shores, CA (US)

(72) Inventor: Dan Cohn, Oakland, CA (US)

(73) Assignee: Oracle International Corporation, Redwood Shores (CA)

( * ) Notice: Subject to any disclaimer, the term of this patent is extended or adjusted under 35 U.S.C. 154(b) by 64 days.

This patent is subject to a terminal disclaimer.

(21) Appl. No.: 16/452,174

(22) Filed: Jun. 25, 2019

(65) Prior Publication Data

US 2019/0312914 A1    Oct. 10, 2019

Related U.S. Application Data

(63) Continuation of application No. 14/799,938, filed on Jul. 15, 2015, now Pat. No. 10,397,283.

(51) Int. Cl.
*H04L 29/06*   (2006.01)
*H04W 88/16*   (2009.01)

(52) U.S. Cl.
CPC .......... *H04L 65/104* (2013.01); *H04L 65/103* (2013.01); *H04W 88/16* (2013.01)

(58) Field of Classification Search
CPC .............................. H04L 29/06; H04W 88/16
See application file for complete search history.

(56) References Cited

U.S. PATENT DOCUMENTS

| 2007/0097974 | A1  | 5/2007  | Ward et al. |
| 2009/0144390 | A1* | 6/2009  | Previdi ................... H04L 45/18 709/217 |
| 2013/0223276 | A1  | 8/2013  | Padgett |
| 2014/0086253 | A1  | 3/2014  | Yong |
| 2014/0129735 | A1* | 5/2014  | Thyni ..................... H04L 45/04 709/241 |
| 2014/0369345 | A1  | 12/2014 | Yang et al. |
| 2015/0244617 | A1  | 8/2015  | Nakil et al. |
| 2015/0263899 | A1  | 9/2015  | Tubaltsev et al. |
| 2016/0020922 | A1  | 1/2016  | Sung et al. |
| 2016/0050152 | A1  | 2/2016  | Sung et al. |
| 2016/0134520 | A1  | 5/2016  | Kapadia et al. |

(Continued)

OTHER PUBLICATIONS

Worster, et al., "Encapsulating MPLS in IP or Generic Routing Encapsulation (GRE)", Network Working Group, Request for Comments (RFC) 4023, The Internet Society, Mar. 2005, 14 pages.

(Continued)

*Primary Examiner* — Jeffrey M Rutkowski
*Assistant Examiner* — Basil Ma
(74) *Attorney, Agent, or Firm* — Invoke

(57) ABSTRACT

A symmetric flow response path from an Autonomous System (AS) can be forced by using a same edge gateway for ingress and egress of communications with an Internet source. An asymmetric flow response path from an AS can be used by using different edge gateways for ingress and egress of communications with an Internet source. An anycast IP address can be used for selecting egress edge gateways of an AS. Packets in an AS can be redirected to selected egress edge gateways of the AS.

17 Claims, 13 Drawing Sheets

(56) References Cited

U.S. PATENT DOCUMENTS

2016/0261486 A1    9/2016   Fang et al.
2017/0005923 A1    1/2017   Babakian

OTHER PUBLICATIONS

Rekhter, et al., "A Border Gateway Protocol 4 (BGP-4)", Network Working Group, RFC 4271, The Internet Society, Jan. 2006, 104 pages.
Oracle International Corporation, "Planning for Network Deployment in Oracle(Registered) Solaris 11.2", Jul. 2014, 32 pages.
Mahalingam, et al., "Virtual extensible Local Area Network (VXLAN): A Framework for Overlaying Virtualized Layer 2 Networks over Layer 3 Networks", Independent Submission, Request for Comments (RFC) 7348, IETF Trust, Aug. 2014, 22 pages.
Durham, et al., "The COPS (Common Open Policy Service) Protocol", Network Working Group, Request for Comments (RFC) 2748, The Internet Society, Jan. 2000, 38 pages.
Dommety. G., "Key and Sequence Number Extensions to GRE", Network Working Group, Request for Comments (RFC) 2890, The Internet Society, Sep. 2000, 7 pages.
Dommety, G. "Key and Sequence Number Extensions to GRE" Request for Comments (RFC) 2890. The Internet Society. Sep. 2000.
Balakrishnan, Hari 2009 Wide-Area Internet Routing Course Notes downloaded from http://web.mit.edU/6.033/www/papers/InterdomainRouting.pdf.

\* cited by examiner

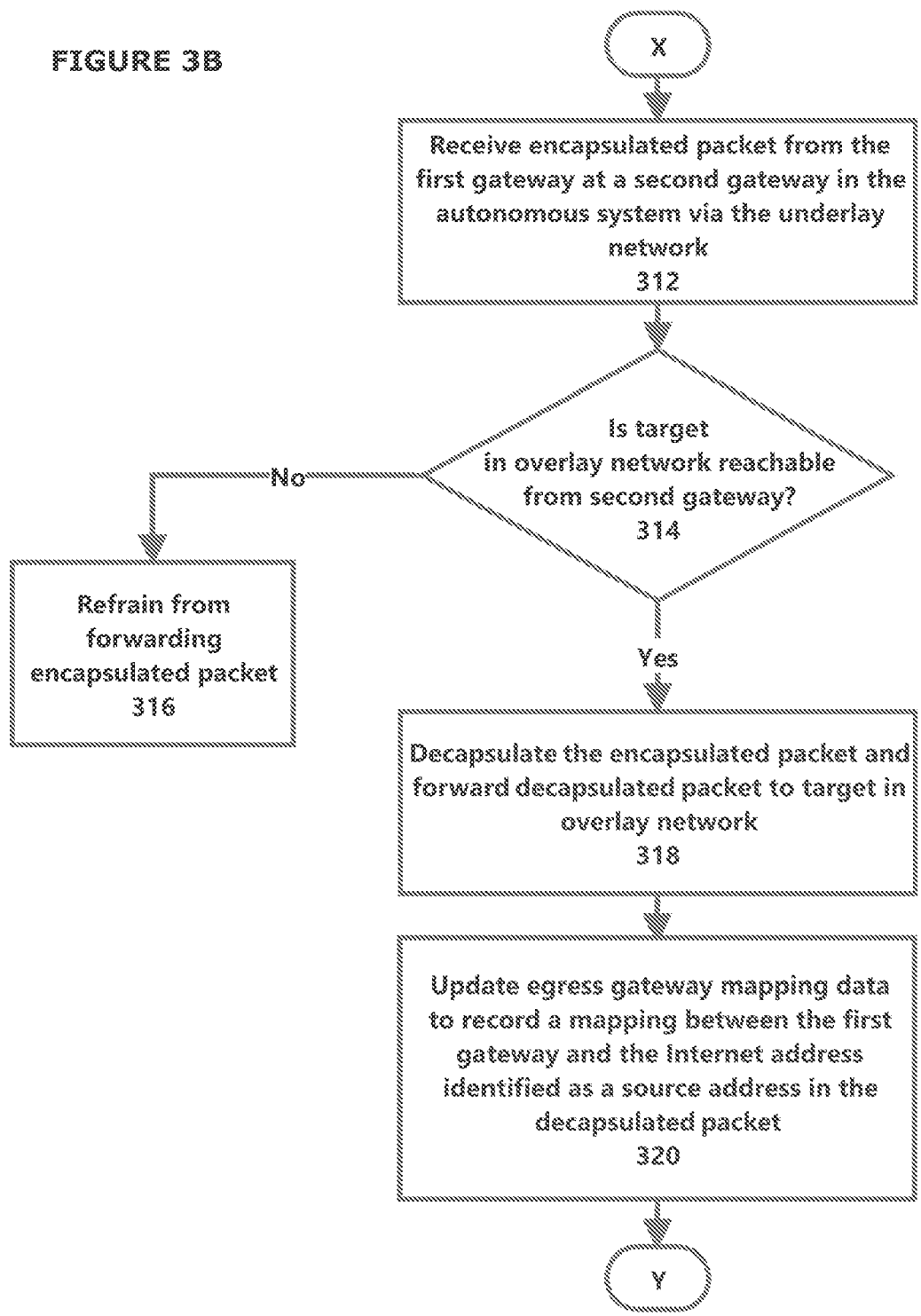

USING SYMMETRIC AND ASYMMETRIC FLOW RESPONSE PATHS FROM AN AUTONOMOUS SYSTEM

INCORPORATION BY REFERENCE; DISCLAIMER

The following application is hereby incorporated by reference: application Ser. No. 14/799,938 filed on Jul. 15, 2015. The Applicant hereby rescinds any disclaimer of claim scope in the parent application(s) or the prosecution history thereof and advises the USPTO that the claims in this application may be broader than any claim in the parent application(s). Each of the following documents are hereby incorporated by reference:
  (a) Rekhter, et al. "A Border Gateway Protocol 4 (BGP-4)." Request For Comments (RFC) 4271. The Internet Society. January 2006.
  (b) Mahalingam, et al. "Virtual eXtensible Local Area Network (VXLAN): A Framework for Overlaying Virtualized Layer 2 Networks over Layer 3 Networks." Request For Comments (RFC) 7348. IETF Trust. August 2014.
  (c) Worster, T. et al. "Encapsulating MPLS in IP or Generic Routing Encapsulation (GRE)." Request For Comments (RFC) 4023. The Internet Society. March 2005.
  (d) Durham, Ed., et al. "The COPS (Common Open Policy Service) Protocol." Request For Comments (RFC) 2748. The Internet Society. January 2000.
  (e) Dommety, G. "Key and Sequence Number Extensions to GRE." Request For Comments (RFC) 2890. The Internet Society. September 2000.

TECHNICAL FIELD

The present disclosure relates to autonomous systems with multiple egress gateways. In particular, the present disclosure relates to techniques for using overlay networks to select egress gateways to create symmetric and asymmetric flow response paths.

BACKGROUND

One way of looking at the entire Internet routing architecture is a set of domains where within each domain there is an internal routing environment. Each domain is a single administrative domain, operated within a uniform set of routing policies, and is operated independently from any other domain. The domain is in effect an autonomous unit in the overall routing architecture, and is termed an Autonomous System (AS). Each particular AS appears to other ASs to have a single coherent internal routing plan and presents a consistent picture of what destinations are reachable through the particular AS. Each of these ASs is uniquely identified using an Autonomous System Number (ASN). An ASN could be assigned, for example, to a network service provider (NSP), a large company, a university, a division of a company, or a group of companies.

The inter-domain routing environment describes how domains interconnect, but avoids the task of maintaining transit paths within each domain. In the inter-domain space, a routing path to an address is described as a sequence of domains that must be transited to reach the domain that originates that particular address prefix. Today this inter-domain space is maintained using Version 4 of the Border Gateway Protocol (BGPv4), RFC 4271.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 2, 3A-3C, 4, and 5 illustrate various operations in accordance with one or more embodiments;

DETAILED DESCRIPTION

Figure 1A:
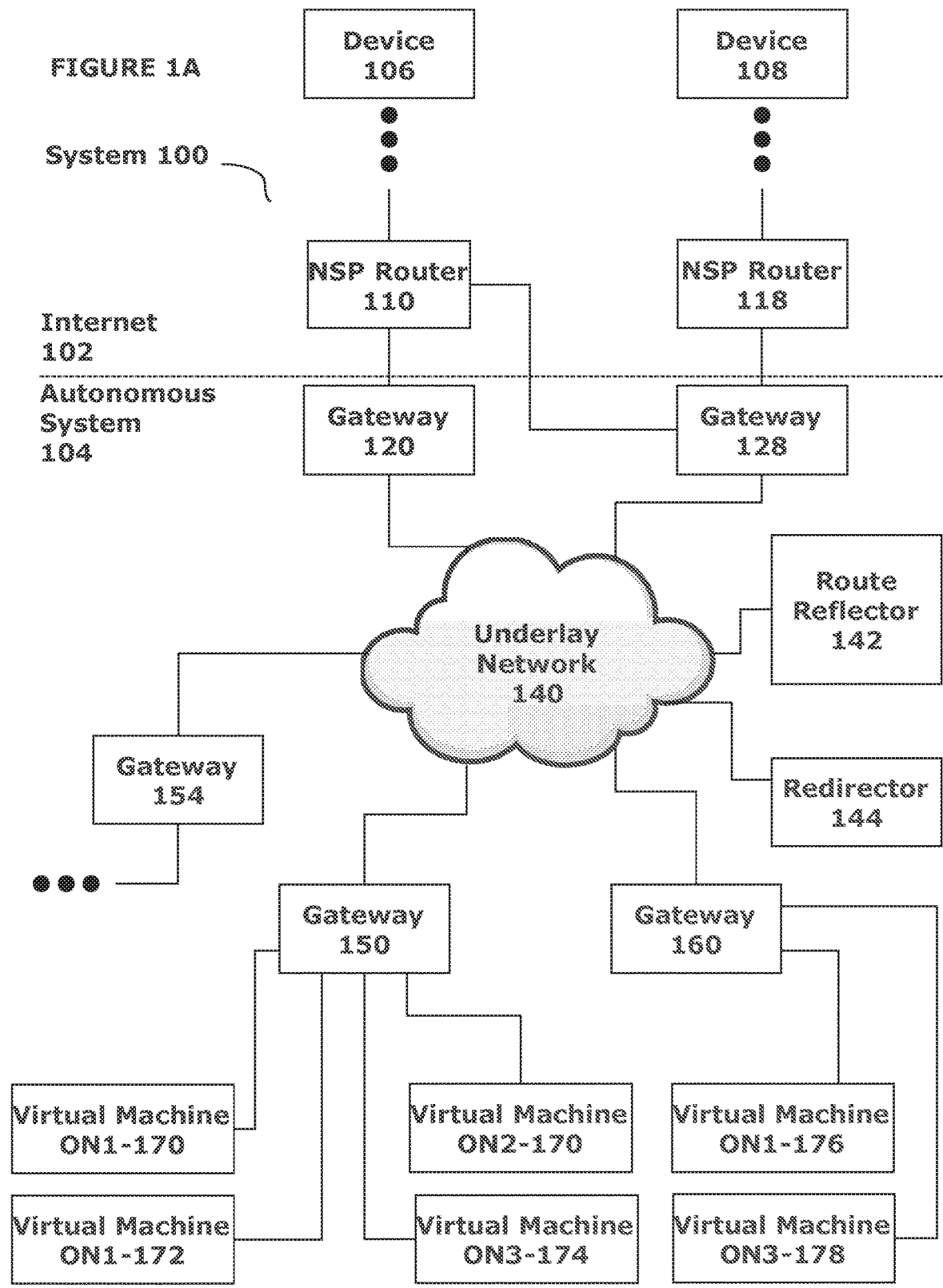
FIGS. 1A-1C illustrate a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.
  1. GENERAL OVERVIEW
  2. ARCHITECTURAL OVERVIEW
  3. ENCAPSULATING AND DECAPSULATING PACKETS
  4. FORCING SYMMETRIC RETURN PATHS FOR EGRESS FROM AN AUTONOMOUS SYSTEM
  5. USING ASSYMETRIC RETURN PATHS FOR EGRESS FROM AN AUTONOMOUS SYSTEM
  6. REDIRECTING PACKETS IN AN AUTONOMOUS SYSTEM TO AN EGRESS GATEWAY
  7. EXAMPLE EMBODIMENTS
  8. MISCELLANEOUS; EXTENSIONS
  9. HARDWARE OVERVIEW

1. General Overview

In an embodiment, symmetric flow response paths are forced for packets being transmitted out of an AS. Forcing symmetric flow response paths includes using a particular edge gateway of the AS, for egress of a response packet toward an Internet address, which was previously used for ingress of one or more packets from the Internet address into the AS.

Forcing a symmetric flow response path includes configuring devices within the AS to route the response packet, addressed to the Internet address, to the particular edge gateway that was previously used for ingress of one or more packets from the Internet address. Specifically, at least one device within the AS (e.g., non-edge gateways, hypervisors, etc.) is configured to map the particular edge gateway to the Internet address. The device is further configured to encapsulate the response packet and address the encapsulated response packet to the particular edge gateway. Encapsulating the response packet hides the destination of the response packet (i.e., the Internet address) from one or more intermediate routing devices within the AS that are traversed as the response packet is being transmitted to the particular edge gateway. The intermediate routing devices route the encapsulated response packet to the particular edge gateway as specified in a destination field of the outer header of the encapsulated response packet. Upon receipt of the encapsulated response packet, the particular edge gateway decapsulates the encapsulated response packet to obtain the response packet and thereafter, transmits the response packet out of the AS toward the Internet address.

In an embodiment, an anycast IP address is used for transmitting response packets to edge gateways for transmission by the edge gateways out of an AS. When using an anycast IP address, a packet is routed to a closest edge gateway of one or more edge gateways that are currently associated with the anycast IP address. The use of an anycast IP address for transmitting packets to an edge gateway may result in an asymmetric response flow path. Specifically, the edge gateway used for egress of a response packet from an AS toward an Internet address may be different than the edge gateway used for ingress of one or more packets from the Internet address into the AS.

Using an anycast IP address includes configuring devices within the AS to encapsulate response packets addressed to an Internet address external to the AS and address the encapsulated response packets to the anycast IP address. Encapsulating the response packets hides the destination of the response packets (i.e., the Internet address) from one or more intermediate routing devices within the AS that are traversed as the response packet is being transmitted to a closest edge gateway that is currently associated with the anycast IP address. Upon receipt of the encapsulated response packet, the closest edge gateway decapsulates the encapsulated response packet to obtain the response packet and thereafter, transmits the response packet out of the AS toward the Internet address. The closest edge gateway, used as an egress point for the AS to transmit packets to the Internet address, may be different than an edge gateway previously used as an ingress point for receiving packets from the Internet address into the AS. Using different edge gateways for ingress into the AS and egress out of the AS in communications with the Internet address is referred to herein as an asymmetric flow response path.

In an embodiment, response packets are transmitted to edge gateways of an AS using a middlebox which may be on a path between internal gateways and edge gateways. A middlebox is referred to herein as a redirector. Devices within the AS (e.g., a non-edge gateway, hypervisor) are configured to encapsulate any response packets addressed to an Internet address external to the AS. The devices are further configured to address the encapsulated response packet to a redirector. Addressing the encapsulated response packet to the redirector includes addressing the encapsulated response packet to a known IP address of the redirector or addressing the encapsulated response packet to an anycast IP address currently associated with the redirector. Upon receipt of the encapsulated response packets, the redirector decapsulates the encapsulated response packet to obtain the response packet. The redirector determines the edge gateway for transmitting the response packet based on one or more of: data routing policies, egress gateway mapping data, and Internet routing tables. The redirector re-encapsulates the response packet and transmits the re-encapsulated response packet to the selected edge gateway. Upon receipt of the re-encapsulated response packet, the edge gateway decapsulates the re-encapsulated response packet to obtain the response packet and thereafter, transmits the response packet out of the AS toward the Internet address. In an illustrative example, a large company with one ASN could be connected to one or more NSP's each with their own ASNs. The large company network is commonly connected to multiple network service providers (NSPs) in the Internet through a border network. The border network may include a number of border routers, each implementing the Border Gateway Protocol (BGP) such as BGP v.4. The border routers themselves are fully connected. Because devices in the border network are required to exchange routing and reachability information among domains, e.g., other ASs, across the Internet, the devices may be required to maintain copies in memory of the Inter-domain (i.e. BGP) routing table, which may exceed 500,000 BGP routes. At the same time, the border network devices may be duplicated for redundancy, availability and scalability. The border routers are usually very expensive and specialized devices. Each border router is connected to one or more local network routers, e.g., default routers, which manage packet routing in the local network, i.e., routing within the domain. The local network routers can be connected to other local network routers or to hosts. See for example: Oracle International Corporation. "Planning for Network Deployment in Oracle® Solaris 11.2." July 2014. The local network routers are far less expensive and complicated than the border routers, i.e., they are commodity routers.

Further in the above illustrative example, part or all of the above company network is cloud enabled and thus uses an overlay network such as the Virtual eXtensible Local Area Network (VXLAN) as explained in RFC 7348, to address the need within a virtualized data center to accommodate multiple tenants. From RFC 7348, the overlay network runs over the existing physical networking infrastructure, i.e., underlay network, and provides a means to "stretch" an Open Systems Interconnection (OSI) Layer 2 network. In short, VXLAN is a Layer 2 overlay scheme on a Layer 3 network. Each overlay is termed a VXLAN segment. Only Virtual Machines (VMs) within the same VXLAN segment can communicate with each other. Each VXLAN segment is identified through a 24-bit segment ID, termed the "VXLAN Network Identifier (VNI)". The 24-bit segment ID allows up to 16 M VXLAN segments to coexist within the same administrative domain. The VNI identifies the scope of the inner media access control (MAC) frame originated by the individual VM. Thus, overlapping MAC addresses could be used across segments but never have traffic "cross over" since the traffic is isolated using the VNI. The VNI is in an outer header that encapsulates the inner MAC frame originated by the VM.

One or more embodiments are applicable to transmissions between devices across an OSI Layer 3 network. A first device within an AS transmits a particular OSI Layer 3 packet to an internal gateway within the AS. The particular OSI Layer 3 packet is encapsulated within an outer Layer 3 packet addressed to and forwarded to an edge gateway (e.g., over a Layer 3 underlay network). The edge gateway decapsulates the outer Layer 3 packet to obtain the particular OSI Layer 3 packet, transmitted by the first device, from transmission out of the AS.

In other embodiments the overlay network could include, but not limited to, MPLS [Multiple Protocol Label Switching] over GRE [Generic Routing Encapsulation] network (see, for example, RFC 4023). Embodiments are also applicable to pure MPLS implementations where data is directed from one network node to the next based on short path labels rather than long network addresses. The labels identify virtual links (paths) between distant nodes rather than endpoints.

In one embodiment implementing a symmetric return path, a packet is received at the ingress point to the domain via an edge gateway. The packet has the Source IP (SIP) address of an Internet user at a source Autonomous System (AS) and the Destination IP (DIP) which represents the static public DIP of a destination AS. In this embodiment, for symmetric flow, it may be assumed that a packet from the ingress point of the destination AS goes through the internal routing domain to a hypervisor executing a virtual machine. The return packet goes back through the internal routing domain to the egress point which is the same as the ingress point. Thus maintaining the above Internet user SIP, static public DIP information in the packet and return packet route allows this loop back.

In another embodiment, the overlay network connects the edge gateway to a second gateway. In this embodiment, the virtual tunnel from the ingress encapsulated packet goes from the edge gateway to the second gateway. The overlay network is overlaid on an underlay network that includes a Clos and/or folded Clos (fat tree) network to ensure non-blocking connectivity between all gateways. The second gateway includes a translation and redirection device. The second gateway will decapsulate the encapsulated packet and send the decapsulated packet to the compute node where the response packet will be created. The response packet from the compute node is sent to the second gateway, where the response packet is encapsulated and sent via a second virtual tunnel over the overlay network to the edge gateway router to be decapsulated and returned to the Internet user.

Thus, in some embodiments, all packets entering or exiting the overlay network are encapsulated before passing over the edge of that overlay network. This applies equally to traffic coming from the Internet, a private VPN, from any provisioned VM, or from any provisioned bare metal machine.

The edge gateways in some embodiments are specialized, complicated border routers, while the gateways connected to the compute nodes are more general purpose, commodity routers. In other embodiments, because the overlay network core is simplified using Clos or folded Clos connections, and because new routers can be configured to also do translation and redirection and have greatly improved memory and processing power, the amount of border routers can be reduced.

One or more embodiments described in this Specification and/or recited in the claims may not be included in this General Overview section.

2. Architectural Overview

FIG. 1A illustrates an example of a system 100 in accordance with one or more embodiments. Other embodiments may include more or less devices and more or less components than illustrated in system 100 and/or described below. Hardware components, software components, and/or functionality described as corresponding to one device may instead correspond to another device. Components illustrated separately may be combined into a single component or implemented on a single device. Accordingly, the scope of the claims should not be construed as being limited by the specific examples herein.

System 100 illustrates devices inside of AS 104 and devices on the Internet 102 that are external to AS 104. Devices within System 100 may be referred to as compute nodes. A compute node is any device that includes at least one hardware processor and functionality to execute operations using the hardware processor. A single compute node may concurrently execute multiple operating systems and/or applications. In this illustrative example, device 106, device 108, NSP Router 110, and NSP Router 118 are external to AS 104. Gateways 120, 128, 150, 154, and 160 are inside AS 104. In addition, Route Reflector (RR) 142 and redirector 144 are implemented within AS 104. Virtual Machines (VMs) ON1-170, ON1-172, ON2-170, ON3-174, ON1-176, and ON3-178 are executed on compute nodes and are communicatively coupled with the gateways (which may be executed on the same or separate devices). Gateways and virtual machines may be implemented across various compute nodes without restriction. In one example, virtual machine ON1-170 is executed on a compute node that is reachable via gateway 150 being executed on a commodity router separate from the compute node. In another example, virtual machine ON2-170 and virtual machine ON3-174 are reachable via gateway 150 and executed on the same device as gateway 150.

In an embodiment, devices within AS 104 are connected by underlay network 140. Underlay network 140 is made up of networking devices such as switches, routers, and hubs. Routers within the underlay network 149 may be local routers/commodity routers that include functionality to determine a next hop toward a destination within AS 104. Some commodity routers do not have the functionality and/or processing power to compute a next hop based on destinations on the Internet 102. In one example, a commodity router routes an encapsulated packet to a gateway identified in the outer header of the encapsulated packet without identifying or using an inner header of an inner packet stored in the payload of the encapsulated packet. The encapsulation of the inner packet addressed to an Internet destination and the addressing of the encapsulated packet to a destination within AS 104 advantageously obviates the need of underlay network routers to route packets based on destinations on the Internet 102.

Underlay network 140 may be implemented using any routing protocol and device addressing scheme. In one example, which should not be construed as limiting the scope of the claims, underlay network 140 is an Open Systems Interconnection (OSI) Layer 3 network in which packets are forwarded toward destination IP addresses included within packet headers. When a packet being forwarded is an encapsulated packet with an outer header corresponding to an outer packet and an inner header corresponding to an inner packet, the outer header is used to determine the next hop within underlay network 140.

Non-blocking performance in underlay network 140 may be achieved by connecting each gateway device (for example, gateway 120 and gateway 150) to every core device within underlay network 140 in a full-mesh topology. For example, gateway devices 120 and 150 and core devices within underlay network 140 may be arranged in a Clos or folded Clos (i.e., fat-tree) network topology, which allows underlay network 140 to be scaled using small, inexpensive devices with the performance and redundancy of larger, more expensive devices.

In an embodiment, AS 104 corresponds to a multi-tenant environment for storing data and executing operations for multiple tenants. AS 104 is configured to prevent a tenant from accessing data corresponding to other tenants. Tenant isolation within AS 104 is implemented using overlay networks. Each overlay network is a virtual network implemented over the underlay network 140. An overlay/virtual network for each tenant is isolated from overlay/virtual networks for other tenants. Entities within the overlay/virtual network communicate with each other using virtual tunnels (also referred to as "encapsulation tunnels").

RFC 7348 titled "Virtual eXtensible Local Area Network (VXLAN): A Framework for Overlaying Virtualized Layer 2 Networks over Layer 3 Networks" describes one example method for overlaying a virtual network over an underlay network. Specifically, RFC 7348 describes an example of a framework for overlaying a virtual Layer 2 network over an OSI Layer 3 network.

In another example, Generic Routing Encapsulation (GRE) protocol may be used as a framework for overlaying a virtual network over an underlay network. In this example, encapsulation and decapsulation for implementing virtual tunnels is performed in accordance with the GRE protocol (see for example, RFC 2784 and 2890). In another example, an OSI Layer 3 packet may be encapsulated within an outer Layer 3 packet for transmission across an underlay network.

Continuing with FIG. 1A, each overlay network is associated with a respective set of one or more virtual machines for storing data and executing operations. A particular tenant may access VMs on the overlay network corresponding to that particular tenant. However, that particular tenant is prevented from accessing VMs on overlay networks corresponding to other tenants. In the illustrated example, device 108 corresponds to a user device of a first tenant which is assigned an overlay network ON1. ON1 is associated with virtual machines ON1-170, ON1-172, and ON1-176. A second overlay network ON2 is associated with a virtual machine ON2-170. A third overlay network ON3 is associated with virtual machines ON3-174 and ON3-178.

A message may be transmitted to an entity associated with an overlay network by addressing the message to a device with an address in the underlay network 140 that is communicatively coupled to the entity in the overlay network. In an example, virtual machine ON1-170 is an entity in an overlay network ON1. A message addressed to an identifier "170" (overlay network address) in overlay network "ON1" is transmitted to the IP address (underlay network address) corresponding to gateway 150. Gateway 150 is communicatively coupled with virtual machine ON1-170 and may deliver the message to virtual machine ON1-170.

In this illustrative example, ON1-170 and ON2-170 have a same identifier ("170") but are differentiated based on the overlay network to which they belong—ON1 and ON2, respectively. Messages addressed to identifier "170" are transmitted to ON1-170 if a source of the message is associated with ON1. Messages addressed to identifier "170" are transmitted to ON2-170 if a source of the message is associated with ON2. An identifier may correspond to a (Media Access Control) MAC address of a device. Multiple virtual machines may share the same MAC address (or other identifier) as long as they are on different overlay networks.

Continuing with the illustrated example, device 108 is associated with a tenant assigned to ON1. Requests transmitted by device 108 are propagated through AS 104 to virtual machines associated with ON1. However, in the illustrated example, requests transmitted by device 108 to AS 104 are not propagated to virtual machines associated with ON2 or ON3.

In another example, a tenant may correspond to a particular business entity, BigCo Analytics. BigCo Analytics is a division of the company, BigCo. BigCo Analytics is associated with multiple user devices which are allowed to access data associated with BigCo Analytics. The data and related operations for BigCo Analytics are managed by a set of virtual machines on an overlay network assigned to BigCo Analytics. In this particular example, the user devices associated with BigCo Analytics are isolated from and prohibited from communicating with virtual machines on a second overlay network corresponding to another division of BigCo, BigCo Automotive. The user devices associated with BigCo Analytics are also isolated from and prohibited from communicating with virtual machines on a third overlay network corresponding to another tenant, WhiteAcre Properties (not affiliated with BigCo). While the above example relates to business entities, a tenant may simply correspond to an individual user, such as "Bob Smith".

Continuing with FIG. 1A, AS 104 includes a set of gateways. A gateway corresponds to a hardware and/or software component with functionality to forward packets. In an example, a gateway is a programmable Top Of Rack (TOR) switch, within AS 104, that is physically connected to a set of compute nodes executing virtual machines. A gateway may perform one or more processing functions for received packets. Examples of processing functions include, but are not limited to, filtering packets, redirecting packets, translating packets (for example, Network Address Translation), encrypting packets, decrypting packets, encapsulating packets, and decapsulating packets.

In one embodiment, gateways within AS 104 include different components, different data sets, and/or different functionality. For example, a first set of gateways, including Gateway 120, include functionality for transmitting packets out of AS 104 toward destinations on the Internet (for example, device 106) and functionality for transmitting packets toward destinations within AS 104. Gateways that include functionality to transmit packets out of the AS 104 and directly to at least one device external to AS 104 are referred to herein as "edge gateways." The devices that are external to AS 104 and directly connected to at least one of the edge gateways of AS 104 are referred to herein as "logical peers" of AS 104. A logical peer may also refer to a business entity associated with the devices external to the AS 104 and directly connected to one of the edge gateways. The logical peers, on the Internet 102, are typically the first hop or first intermediate destination for packets being transmitted out of AS 104 toward a final destination on Internet 102. In the illustrative example, NSP router 110 corresponds to or is itself a logical peer of AS 104. Furthermore, NSP router 118 corresponds to or is itself a logical peer of AS 104. AS 104 may be connected to any number of logical peers.

A second set of gateways, including gateway 150, include functionality for transmitting packets toward destinations within AS 104 (as a final destination or an intermediate destination toward a final destination on the Internet) but do not have functionality to transmit a packet directly to a destination outside of AS 104.

Figure 1B:
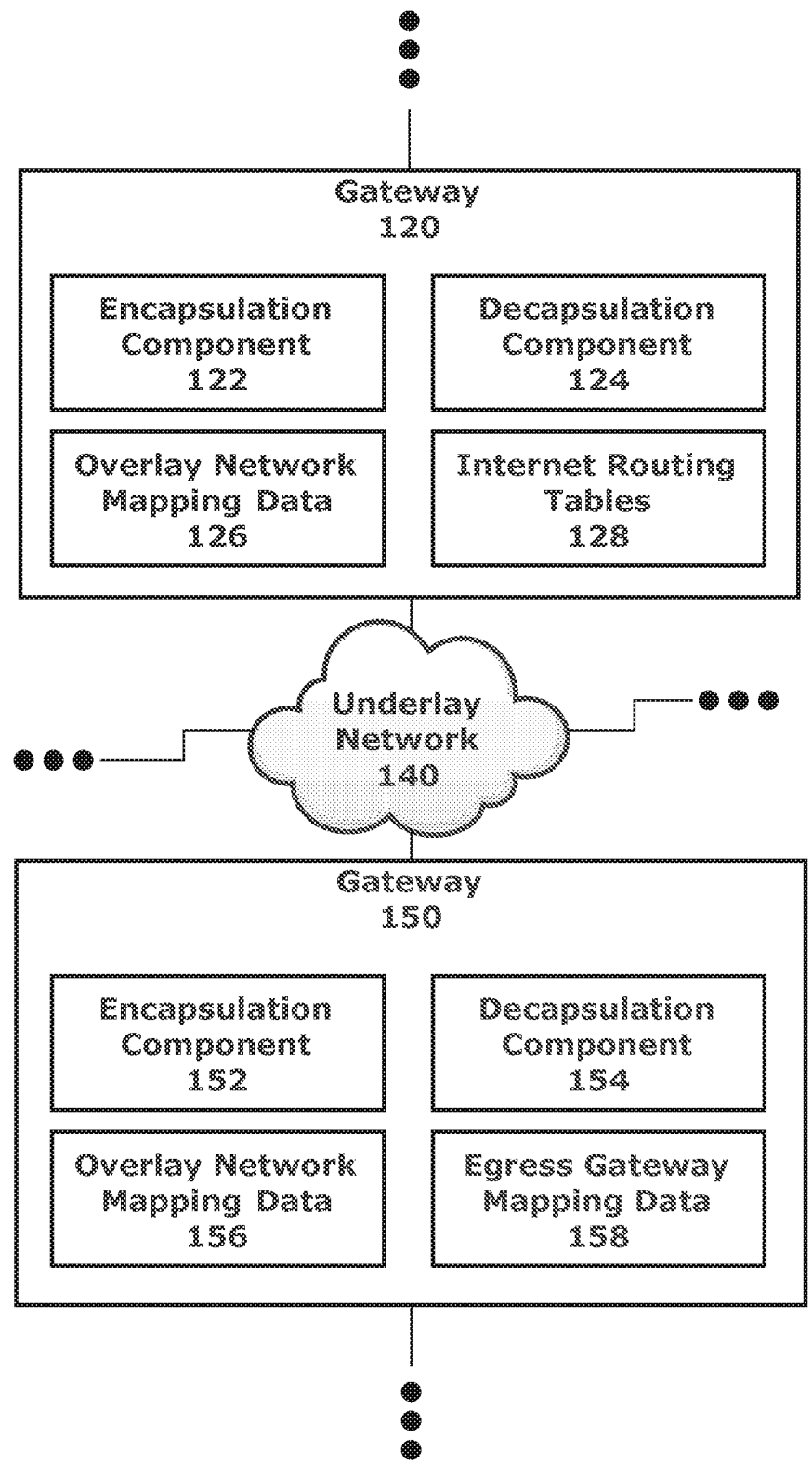

As illustrated in FIG. 1B, Gateway 120 stores Internet routing tables 128 which include information on data paths toward various destinations on the Internet. Internet routing tables 128 may be referred to as Internet Virtual Routing and Forwarding (VRF) Forwarding Information Base (FIB). Internet routing tables 128 may include a very large number of routes (for example, some edge gateways store over 2 million routes). As a result, gateway 120 may be a highly complex and relatively expensive device (in comparison to Gateway 150 described below).

Gateway 120 further includes functionality for transmitting packets toward destinations within AS 104. Packets transmitted by Gateway 120 within AS 104 via underlay network 140 are encapsulated using encapsulation component 122. Encapsulation component 122 corresponds to software and/or hardware for encapsulating packets. Packets received by gateway 120 from sources within AS 104 via underlay network 140 are decapsulated using decapsulation component 124. Decapsulation component 124 corresponds to software and/or hardware for decapsulating packets. The process of encapsulating packets and decapsulating packets is described in detail below with respect to FIG. 2.

In an embodiment, gateway 120 stores overlay network mapping data 126 which maps gateways to virtual machines that may be reached via the gateways. In an example, overlay network mapping data 126 maps virtual machine ON1-170 to gateway 150. The mapping is used to determine that packets to be transmitted to ON1-170 are to be transmitted to gateway 150 for forwarding by gateway 150 to ON1-170. The overlay network mapping data 126 further maps ON1-176 to gateway 160. The mapping is used to determine that packets to be transmitted to ON1-176 are to be transmitted to gateway 160 for forwarding by gateway 160 to ON1-176.

In an embodiment, gateway 150 is another gateway within AS 104 that is communicatively coupled with virtual machines (for example, virtual machines ON1-170, ON1-172, ON2-170, and ON3-174). Gateway 150 may correspond to any penultimate programmable node before an ultimate target destination of a packet. In an embodiment, gateway 150 corresponds to or implements a hypervisor or Virtual Machine Monitor (VMM) that creates and runs virtual machines. The device executing the hypervisor may be referred to as a host machine and each virtual machine may be referred to as a guest machine. The hypervisor and corresponding virtual machines may be executed on a same compute node.

In an embodiment, gateway 150 includes encapsulation component 152, decapsulation component 154, and overlay network mapping data 156 which may be substantially similar to above-described encapsulation component 122, decapsulation component 124, and overlay network mapping data 126, respectively. However, the overlay network mapping data 156 and the overlay network mapping data 126 do not necessarily include identical sets of mapping data.

In an embodiment, gateway 150 includes egress gateway mapping data 158. Egress gateway mapping data 158 maps destinations on the Internet 102 with a particular egress gateway that is to be used for transmitting data out of the AS 104 and toward the destinations on the Internet 102. An egress gateway refers to a gateway through which a packet egresses out of AS 104 to a device on the Internet 102. In an example, egress gateway mapping data 158 maps gateway 120 to device 106. The mapping indicates that packets to be transmitted, by gateway 150 to device 106, may be transmitted from gateway 150 to gateway 120 for forwarding by gateway 120 to device 106. The mapping may further indicate a particular port of gateway 120 for transmitting packets to device 106 at which packets were received by gateway 120 from device 106. In an embodiment, the egress gateway mapping data 158 is stored and updated by gateway 150 as described below with reference to Operation 320 of FIG. 3B. In another embodiment, the mapping information in the egress gateway mapping data 158 is determined by another device (for example, gateway 120 or a controller [not illustrated]) and transmitted to gateway 150. In an embodiment, the egress gateway mapping data 158 is configured to map destinations on the Internet 102 substantially evenly across the edge gateways in AS 104 to balance a load across the edge gateways.

In an embodiment implementing symmetric return paths, an edge gateway used for egress of packets from AS 104 toward a particular address on the Internet 102 is the same as the edge gateway used for ingress of packets from that particular address into AS 104. Specifically, egress gateway mapping data 158 identifies an egress gateway for reaching the particular address on the Internet 102 that is the same gateway used previously for ingress of data from that particular address into AS 104.

In an embodiment implementing asymmetric return paths, an edge gateway used for egress of packets from AS 104 toward a particular address on the Internet 102 is different than the edge gateway used for ingress of packets from that particular address into AS 104. Specifically, the egress gateway mapping data 158 identifies an egress gateway for reaching the particular address on the Internet 102 that is different than a gateway used for ingress of data from that particular address into AS 104. In an embodiment implementing anycasted loopback, as further described below, the egress gateway mapping data 158 may refer to an anycast IP address.

Figure 1C:
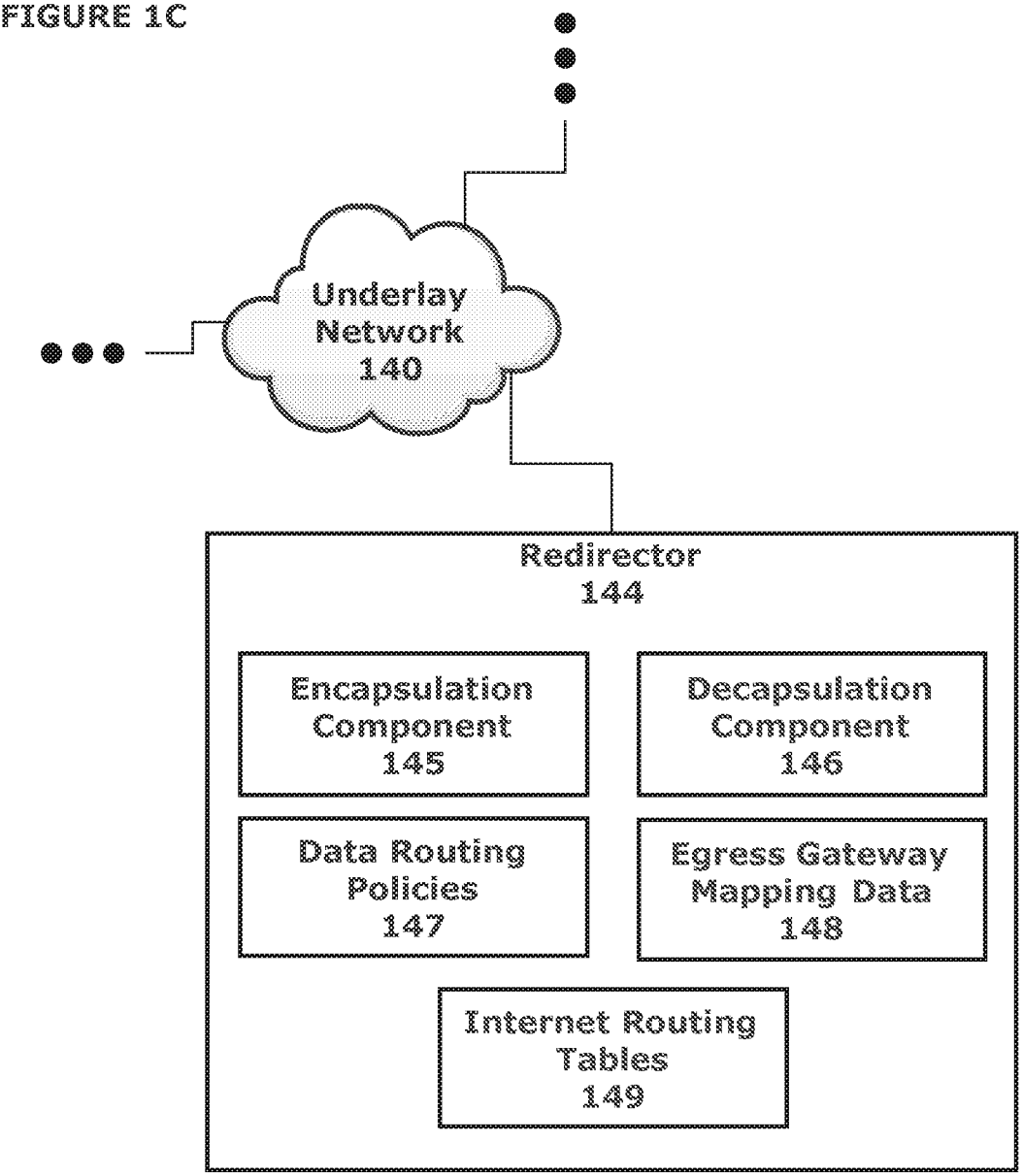

Returning to FIG. 1A, AS 104 includes a redirector 144 in accordance with one or more embodiments. The redirector 144 refers to hardware and/or software with functionality to redirect packets propagating within AS 104 to egress gateways for transmission of the packets out of AS 104. An example set of operations for redirecting a packet propagating within AS 104 is described below with reference to FIG. 5. In an embodiment, redirector 144 includes functionality to select an egress gateway based one or more of: data routing policies 147, egress gateway mapping data 148, and Internet routing tables 149 (illustrated in FIG. 1C for purposes of explanation). In one example, redirector 144 includes data routing policies 147 but does not include egress gateway mapping data 148 or Internet routing tables 149.

In an embodiment, data routing policies 147 identify logical peers (described above) to which outbound data is to be transmitted from AS 104. In an example, data routing policies 147 identify a logical peer for transmitting a set of one or more packets as a function of packet characteristics. Packet characteristics may include, but are not limited to, a final destination, a source device, a source entity, an associated tenant or business entity, a priority, required processing, a signature, and a security/confidentiality level. In one example, a high confidentiality level indicated in a packet requires handling by NSP xyz. The data routing policies identify a NSP router, corresponding to NSP xyz, as a logical peer to which packets with a high confidentiality level are to be transmitted.

In an embodiment, data routing policies 147 identify egress gateways of AS 104 connected to one or more logical peers of AS 104. In an example, data routing policies 147 identify a particular egress gateway for transmitting packets out of AS 104 as a function of a selected logical peer to which the packets are to be transmitted. The particular egress gateway is connected to the selected logical peer and accordingly, the particular egress gateway is suitable for transmitting a packet from AS 104 to the selected logical peer.

The data routing policies 147, illustrated in relation to redirector 144, may be stored on a same device as redirector 144 or on a separate device communicatively coupled to redirector 144. The data routing policies 147 may be generated by redirector 144 or received by redirector 144 from another device within AS 104 such as a controller (not shown) or a network management station (not shown). In one example, the data routing policies 147 for selecting a logical peer and mapping the selected logical peer to a particular egress gateway may be defined by an administrator. While data routing policies 147 are described herein with reference to redirector 144, data routing policies 147 may similarly be used by a gateway (e.g., gateway 150) to select an egress gateway.

In an embodiment, egress gateway mapping data 148 maps Internet addresses to specific egress gateways of AS 104. Egress gateway mapping data 148 is substantially similar to egress gateway mapping data 158, described above. Egress gateway mapping data 148 may be received, by redirector 144, from another device (for example, gateway 120, gateway 150, or RR). Alternatively, egress gateway mapping data 148 may be generated by the redirector 144 by snooping packets propagating within AS 104 that are received from an Internet address external to AS 104. In an example, snooping packets reveals a public IP address of an edge gateway at which a packet is received from a particular Internet address external to AS 104. The redirector 144 generates egress gateway mapping data 158 by mapping the edge gateway to the particular Internet address.

In an embodiment, Internet routing tables 149 include routes to or toward destinations on the Internet 102. Internet routing tables 149 may be substantially similar to or a subset of Internet routing tables 128 stored at the edge gateways of AS 104. In one example, Internet routing tables 149 identify a path toward a destination on the Internet 102. Specifically, the Internet routing tables 149 identify an edge gateway of AS 104 that is on the path toward the destination on the Internet 102.

In an embodiment, encapsulation component 145 and decapsulation component 146 are used for encapsulating packets and decapsulating packets, respectively. Encapsulation component 145 and decapsulation component 146 are substantially similar to encapsulation component 122 and decapsulation component 124 described above. In one example, redirector 144 uses the decapsulation component 146 to decapsulate packets propagating with AS 104, while redirector 144 uses the encapsulation component 145 to re-encapsulate the packets for transmission to a selected edge gateway. Inasmuch as the redirector 144 swaps the encapsulation, the redirector 144 may be referred to as an "encapsulation tunnel-swapping middlebox."

Continuing with FIG. 1A, AS 104 includes RR 142 in accordance with one or more embodiments. RR 142 corresponds to a network routing component that receives and propagates routes within AS 104. RR 142 may be implemented on a dedicated device or any device within AS 104 that performs other functions. The routes propagated by RR 142 are used by various devices (for example, redirector 144) within AS 104 to transmit packets toward destinations within AS 104 (for example, via underlay network 140). In an embodiment, a separate instance of RR 142 is implemented for each overlay network within AS 104.

In an embodiment, a Network Service Provider (NSP) is a business or organization that transmits data between AS 104 and devices on the Internet 102. Multiple NSPs may transmit data between AS 104 and Internet 102. Specifically, each NSP manages routers which forward data between AS 104 and devices on the Internet 102. In some embodiments, an edge gateway (e.g., Gateway 120 or Gateway 128) may be directly connected to an edge gateway in another AS without any intermediate NSP devices.

In the illustrative example, NSP router 110 transmits data originating from device 106 to one of gateway 120 or gateway 128. NSP router 110 also transmits data from gateway 120 or gateway 128 toward device 106. NSP router 118 transmits data originating from device 108 to gateway 128 and transmits data from gateway 128 toward device 108.

3. Encapsulating and Decapsulating Packets

In one or more embodiments, packets are transmitted between gateways (for example, gateway 120 and gateway 150). A transmitting gateway encapsulates the packet before transmission. A receiving gateway decapsulates the packet after receipt. In one example, gateway 120 selects gateway 150 as an egress node for transmission of a packet out of AS 104. By encapsulating the packet, gateway 120 hides the Internet destination of the packet. Gateway 120 advantageously ensures that (a) none of the intermediate nodes between gateway 120 and gateway 150 can modify the selection of the gateway 150 as an egress node and (b) none of the intermediate nodes require Internet routing tables for routing based on the Internet address hidden in the payload of the encapsulated packet.

Figure 2:
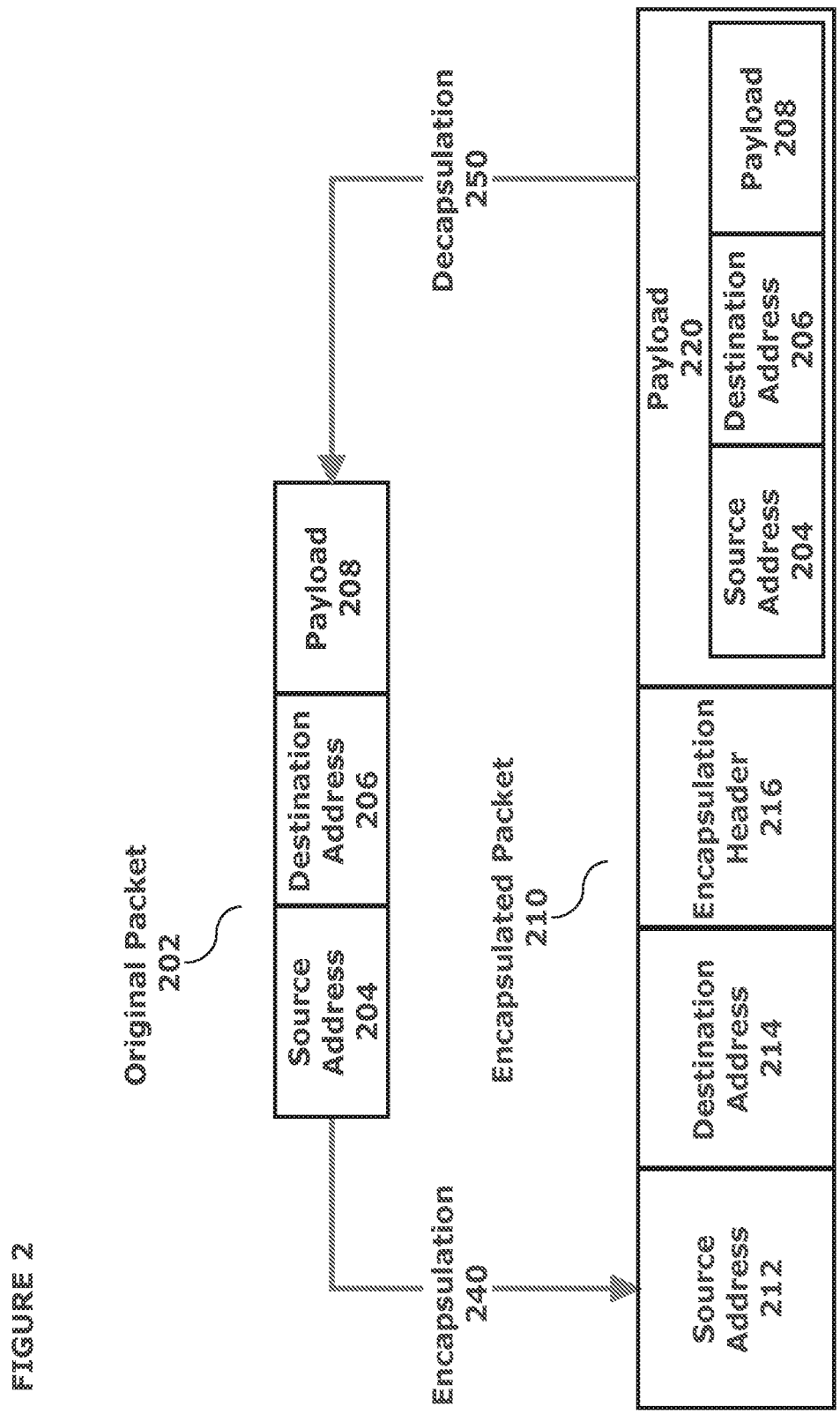

FIG. 2 illustrates the basic elements of an encapsulated packet and the basic elements of the original packet (or decapsulated packet) in accordance with one or more embodiments. The illustrated elements are selected for purposes of clarity and explanation. Embodiments may include more or fewer elements than the illustrated elements.

As illustrated in FIG. 2, an original packet 202 includes a source address 204, a destination address 206, and a payload 208. The source address 204 and destination address 206 are included in a portion of the packet 202 referred to as a packet header. The packet header is separate from the packet payload 208. A source address 204 identifies a source or sender of the packet. If the source address is an IP address, the source address is referred to herein as Source IP (SIP). In one example, a source address, of a packet transmitted from an AS to a device on the Internet, corresponds to the public IP address of a gateway at the edge of the AS that transmitted the packet out of the AS. However, an actual source of the packet is a virtual machine executing on a compute node inside of the AS.

A destination address 206 identifies a destination to which the packet is to be transmitted. The destination address 206 corresponds to a final destination of the packet or to an intermediate destination from which the packet is forwarded toward the final destination. In one example, once a packet is received at an intermediate device corresponding to the destination address 206, the intermediate device performs a Network Address Translation (NAT) to determine a final destination for the packet. The intermediate device modifies the destination field of the packet to the final destination, and forwards the packet to the final destination.

In an embodiment, original packet 202 includes a payload 208 corresponding to a cargo of a packet or data transmission. The data in original packet 202 may be aggregated, by a receiving device, with data in other packets to obtain a content item.

In an embodiment, encapsulation (Operation 240) is a process by which the original packet 202 is encapsulated within an outer packet. The original packet 202 is referred to as an inner packet encapsulated within the outer packet. Various different protocols may be used for encapsulating the packet including, for example, the VXLAN protocol and the GRE protocol referenced above. During the encapsulation process, one or more packet headers are added to the front of the original packet 202.

The resulting encapsulated packet 210 includes payload 220 with the original packet 202 and a new header(s). The header on the encapsulated packet 210 (referred to herein as an outer header) includes a source address 212 and a destination address 214. In an example, source address 212 corresponds to a SIP, while destination address 214 corresponds to a DIP. Source address 212 and destination address 214 are referred to herein as the outer source address and outer destination address, respectively. Source address 204 and destination address 206 are referred to herein as the inner source address and inner destination address, respectively.

In an embodiment, encapsulated packet 210 includes an encapsulation header 216 corresponding to an overlay network. The encapsulation header 216 includes an identifier corresponding to the overlay network and an identifier corresponding to the specific target entity on the overlay network. In one example, an encapsulation header includes Overlay Network Identifier "15" corresponding to a particular overlay network. The encapsulation header further includes a destination MAC address of the virtual machine that is the final destination for original packet 202 included within the payload of the particular encapsulated packet.

In an embodiment, decapsulation (Operation 250) is a process by which outer header(s) of the encapsulated packet 210 are stripped off to obtain the original packet 202. Decapsulating an encapsulated packet results in extracting the inner packet, i.e., original packet 202 from the payload 220 of the encapsulated packet 210.

In an embodiment, gateways (for example, gateways 120 and 150) use encapsulation to transmit packet through an underlay network. Specifically, the gateways serve as end points at which the encapsulation of packets and decapsulation of packets is performed. The gateways are also referred to as endpoints of an encapsulation tunnel or a virtual tunnel. In addition to the gateways, encapsulation and decapsulation is performed by a redirector as described below with reference to FIG. 5.

4. Forcing Symmetric Return Paths for Egress from an Autonomous System

Figure 3A:
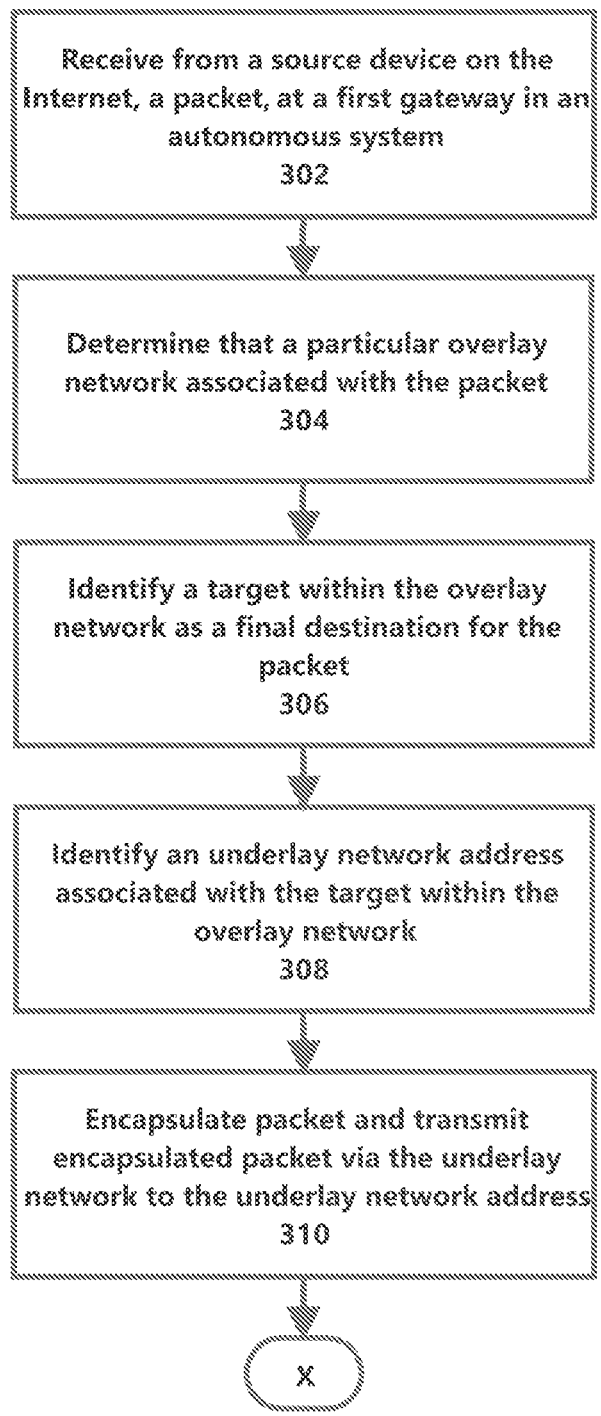
Figure 3C:
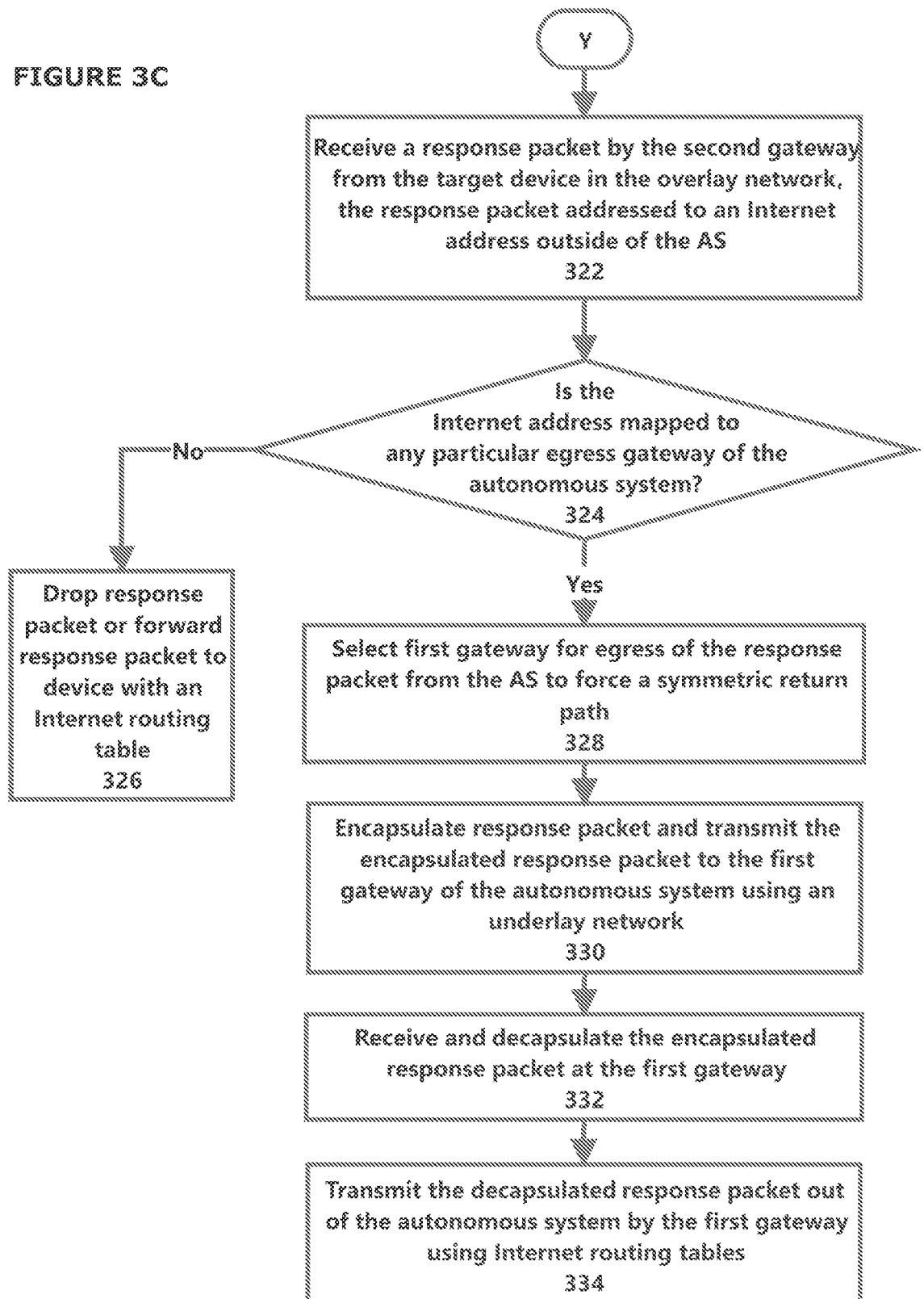

FIGS. 3A-3C illustrate an example set of operations for forcing symmetric return paths for egress from an AS in accordance with one or more embodiments. Forcing a symmetric return path involves forcing the egress of a packet from an AS toward an Internet address through a same edge gateway that was used for ingress of a previous packet from that Internet address into the AS. One or more operations illustrated in FIGS. 3A-3C may be modified, rearranged, or omitted all together. Accordingly, the particular sequence of operations illustrated in FIGS. 3A-3C should not be construed as limiting the scope of one or more embodiments.

As illustrated in FIG. 3A, a packet from a source device on the Internet is received at a first gateway in an AS (Operation 302). The first gateway is an edge gateway of the AS and the packet is received at a particular physical port of the edge gateway. An identifier of particular physical port is stored (e.g., in metadata associated with the packet). A future response packet may be transmitted from the same physical port to the source device on the Internet.

The packet is received at the first gateway via a NSP router that connects the AS to devices on the Internet. The destination address indicated in the packet is the public IP address of the first gateway. Routing of the packet from the source device to first gateway may be performed by various intermediate nodes (for example, Internet backbone routers and NSP routers) that are traversed by the packet. Each of the intermediate nodes perform an Internet routing table lookup based on the pubic IP address of the first gateway, indicated as a destination address in the packet, to determine a next hop. The packet is then transmitted to the next hop and the process is repeated until the packet reaches the first gateway in the AS.

The first gateway determines that a particular overlay network is associated with the packet (Operation 304). Some or all packets received by the first gateway are associated with a corresponding overlay network from a plurality of overlay networks implemented by the AS. Determining the particular overlay network associated with the packet includes querying a database with one or more pieces of information within the packet to determine the particular overlay network associated with the packet. The pieces of information within the packet that may be used to determine the corresponding overlay network include, but are not limited to, a source IP address, a destination IP address, a source MAC address, a destination MAC address, an overlay network identifier, a session identifier, and an identifier of a physical port of ingress. In one example, a source IP address is mapped to a tenant that is assigned to particular overlay network. Alternatively, the source IP address may be directly mapped to the particular overlay network.

The first gateway further determines a target within the overlay network as a final destination for the packet (Operation 306). The packet itself may include information corresponding to the final destination. For example, the packet may include a destination MAC address that corresponds to the final destination. Alternatively, the final destination for the packet may be determined by querying a database with one or more pieces of information within the packet (described above). In one example, executing a query with the source IP address combined with an identifier of a physical port of ingress, or session identifier results in identification of the target within the overlay network that is the final destination of the packet. In this example, the query results in the identification of MAC address on the particular overlay network identified in Operation 304.

In an embodiment, the target is determined to be a virtual machine that provides a service, by executing operations, that is used by a device(s) external to the AS. In an example, the virtual machine corresponding to a tenant is accessed by multiple devices also corresponding to the tenant. In one example, a new instance of the virtual machine is spun up by a hypervisor for each session and terminated at the end of the session. In another example, the virtual machine is persistent across multiple sessions. Accordingly, a user connects to the virtual machine via the AS, logs-off, and logs back in to connect to the same virtual machine.

In another example, the target for the packet is created at runtime after the packet is received. The AS determines the packet is from a tenant BlackAcre Properties that is assigned to an overlay network ON45. The AS spins up a new virtual machine on overlay network ON45 and thereafter, transmits the packet to the new virtual machine for further processing.

The target in the overlay network is reached by transmitting the packet via an underlay network. In order to transmit the packet to the target in the overlay network, an underlay network address used for reaching the target within the overlay network is identified (Operation 308). In an example, the underlay network address is the address of a second gateway that is communicatively coupled with the target in the overlay network. Determining the underlay network address that can be used to reach the target in the overlay network includes querying a database with information corresponding to the target in the overlay network. In one example, different entities of an overlay network are reachable via different gateways. In this example, an identifier for the target and an identifier for the overlay network are both used as input in a query to identify the underlay network address. In another example, all entities corresponding to any particular overlay network are reachable via a same gateway. If all entities corresponding to any particular overlay network are reachable via a same gateway, the identifier of the overlay network, with which the target is associated, may be sufficient to determine the gateway (and corresponding underlay network address) for transmitting the packet.

The packet is encapsulated and transmitted via the underlay network to the underlay network address (Operation 310). An example process for encapsulating the packet to obtain an encapsulated packet is described above with reference to FIG. 2. The header of the encapsulated packet identifies the underlay network address, identified in Operation 308, as a destination address used for propagating the encapsulated packet through the underlay network. Furthermore, the header of the encapsulated packet identifies the first gateway as a source of the encapsulated packet. In one example, the source of the encapsulated packet is listed as the private IP address of the first gateway, not the public IP address of the first gateway used for routing outside of the AS. Transmitting the encapsulated packet to the underlay network address includes transmitting through one or more intermediate nodes between the first gateway and the second gateway corresponding to the underlay network address identified in Operation 308.

Continuing to FIG. 3B, the encapsulated packet is received from the first gateway at the second gateway in the AS via the underlay network in accordance with one or more embodiments (Operation 312). The second gateway performs a check to determine whether the encapsulated packet received from the first gateway is to be dropped or forwarded. Specifically, in order to maintain tenant isolation in a multi-tenant environment example, the second gateway ensures that the packet is only forwarded to entities on the same overlay network that corresponds to the packet.

The second gateway determines if the target (identified by the target identifier and by the overlay network to which the target belongs) is reachable from the second gateway (Operation 314). The entities reachable from the second gateway include entities that are communicatively coupled with the second gateway. In one example, the second gateway is implemented as a programmable Top Of Rack (TOR) router connected to a set of compute nodes in a same rack that execute virtual machines reachable from that TOR router. The TOR router may be physically connected via a wired medium and/or wirelessly connected to the compute nodes within the same rack. Determining if the target is reachable from the second gateway may include comparing the target to a list of devices that are reachable from the second gateway. If the target is not included within the list of devices, then the target is not reachable from the second gateway and the encapsulated packet is not forwarded (Operation 316).

For reachable targets, the second gateway decapsulates the encapsulated packet to obtain the inner packet which is forwarded to the target in the overlay network (Operation 318). Decapsulation includes stripping away the headers added during the encapsulation process by the first gateway. Headers and/or data within the packet (inner packet that is extracted from the encapsulated packet) may be modified by the second gateway prior to forwarding the packet to the target in the overlay network. For example, the packet may be modified to include an IP address of the target as the destination address of the packet. Detailed examples of modifying packets by various devices as the packets traverse through the AS are described below with reference to FIGS. 6A, 6B, and 7. Transmitting the packet from the second gateway to the target in the overlay network may include transmitting the packet using an OSI Layer 2 protocol.

In an embodiment, egress gateway mapping data stored at the second gateway is updated to record a mapping between the first gateway (from which the encapsulated packet was received) and the Internet address identified as a source address in the decapsulated packet (Operation 320). Mapping the first gateway to the Internet address is based on receiving inner packet sourced from the Internet address within an encapsulated packet from the first gateway. Receiving the encapsulated packet from the first gateway is indicative of a data path from the second gateway to the Internet address via the first gateway. In one example the second gateway may be hard coded to map the source address of the encapsulated packet (the first gateway) to the source address of the inner packet (the device on the Internet) without performing any further analysis. In an embodiment, the mapping further includes an identifier of the physical port, of the first gateway, at which packets were received from the first gateway. Packets to be transmitted (e.g., response packets) from the first gateway to the Internet address are transmitted via the same physical port. A physical port to Internet address bridge table at the first gateway may include the mapping between physical port and the Internet address. The physical port may be included within metadata transmitted with the packet to the destination within the AS. Further a response packet from the destination within the AS may include the same physical port that is to now be used for transmitting the response packet out of the AS toward the Internet address.

In another embodiment, updates to the egress gateway mapping data stored at the second gateway are received from another device. In an example, updates to the egress gateway mapping data are transmitted to the second gateway from the first gateway, from a controller, or from any other network device within the AS. Although Operation 320 is illustrated as being performed after Operation 318, Operation 320 may be performed before Operation 318.

Continuing to FIG. 3C, a response packet, addressed to an Internet address outside of the AS, is received by the second gateway from the target in the overlay network (Operation 322). The response packet is any type of response and/or confirmation that is responsive to a packet(s) previously transmitted to the target device. In an example, the response packet is an acknowledgement frame. In another example, the response packet includes data requested by data transmitted to the target. The response packet may not necessarily be related to a last-received packet at the target. The response packet may be responsive to any packet(s) received by the target device. Embodiments herein referring to the response packet are equally applicable to any packet being transmitted from the target device in the overlay network to an Internet address external to the AS.

The second gateway determines whether the Internet address (destination address of response packet) is mapped to any particular egress gateway of the AS (Operation 324). The determination is made by comparing the Internet address to addresses within egress gateway mapping data stored at the second gateway. If the Internet address is not mapped to any particular egress gateway, then the packet is dropped or forwarded to any device with an Internet routing table (Operation 326). In an alternate example, when the Internet address is not found, the packet is encapsulated and transmitted to a redirector or other device that includes Internet routing tables.

In an embodiment, the second gateway identifies the particular egress gateway for transmitting the packet out of the AS based on any other information within the packet. In an example, a session, flow, or connection identified in the packet is mapped to a particular egress gateway, and optionally the physical port on the particular egress gateway. Specifically, one or more values of a 5-tuple may be mapped to a particular egress gateway. The 5-tuple refers to a set of five different values that comprise a, a source IP address/port number, destination IP address/port number and the protocol in use.

In an embodiment, the second gateway finds the Internet address within the egress gateway mapping data. The second gateway determines that the Internet address is mapped to a particular egress gateway of a set of egress gateways for the AS. In this illustrated example, the Internet address is mapped to the first gateway referred to in Operation 302. Based on the mapping, the first gateway is selected for egress of the response packet from the AS to force a symmetric return path (Operation 328). Selection and use of the first gateway forces a symmetric return path out of the AS toward the Internet address because the first gateway was used for ingress of packets from that Internet address as indicated above with reference to Operation 302.

The second gateway encapsulates the response packet and transmits the encapsulated response packet to the first gateway using the underlay network (Operation 330). Transmission of the encapsulated response packet via the underlay network to the first gateway is substantially similar to transmission of the encapsulated packet via the underlay network as described above with reference to Operation 310.

The first gateway, that previously served as the ingress gateway, receives and decapsulates the encapsulated response packet (Operation 332). The response packet is then transmitted by the first gateway out of the AS using Internet routing tables (Operation 334). Transmitting the response packet out of the AS includes determining the destination address of the response packet. The destination address is used to perform a lookup on Internet routing tables to determine a next hop toward the destination address. Selecting the next hop may include selecting one NSP router from a set of NSP routers associated with the same NSP or different NSPs. Once the next hop is selected, the first gateway transmits the response packet out of the AS to the next hop.

5. Using Asymmetric Return Paths for Egress from an Autonomous System

Figure 4:
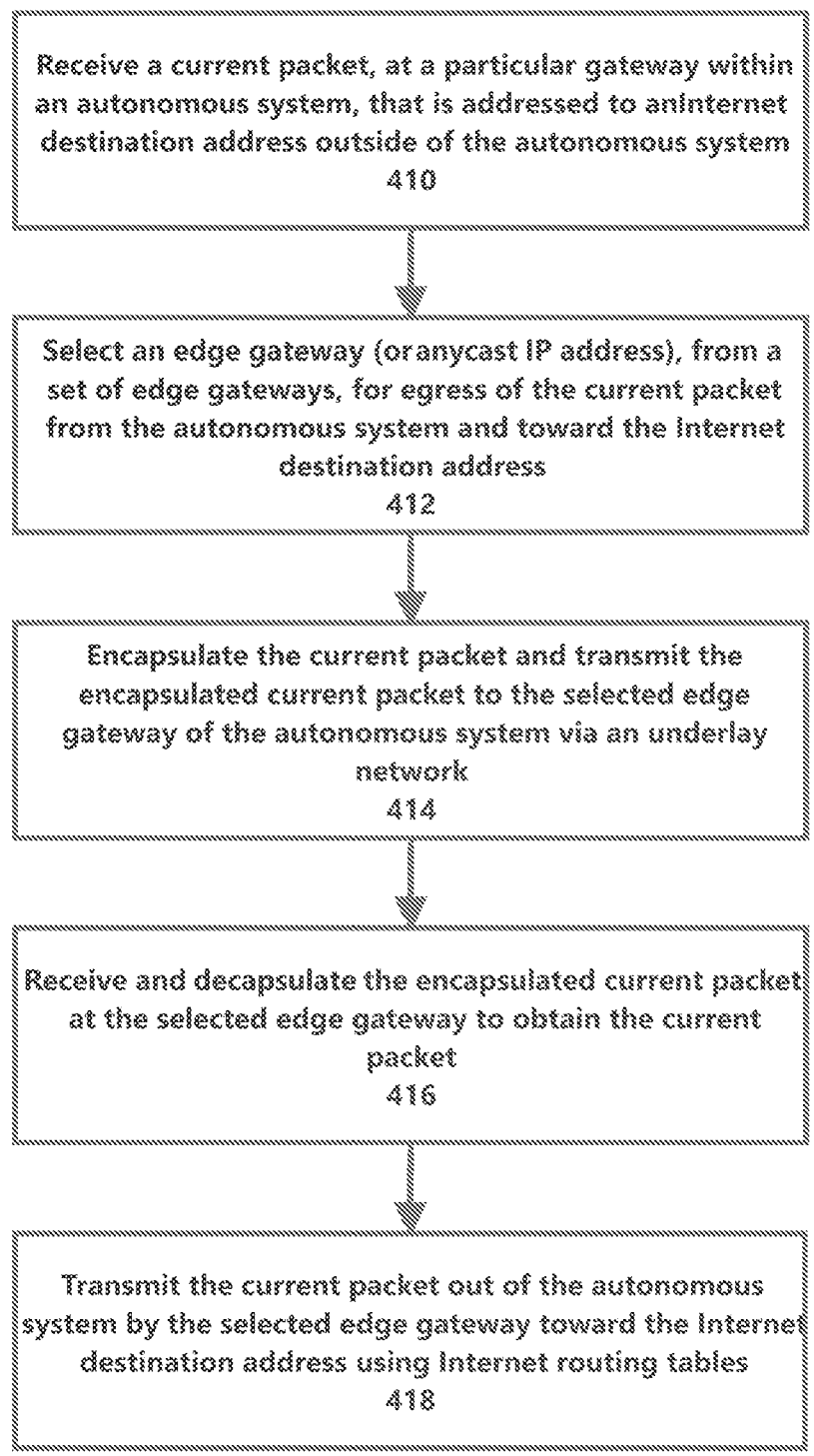

FIG. 4 illustrates an example set of operations for using asymmetric return paths for egress from an AS in accordance with one or more embodiments. Selecting an asymmetric return path includes selecting a particular edge gateway for egress of a current packet from an AS toward an Internet address that is different than an edge gateway that was used for ingress of a previous packet from that Internet address into the AS.

In an embodiment, anycasted loopback (described below) is used for transmitting a packet out the AS which may result in an asymmetric return path for some packets and a symmetric return path for other packets.

In another embodiment, the egress edge gateway is intentionally selected to be different than the ingress edge gateway. In another embodiment, the edge gateway for egress is selected based on any number of factors which may not necessarily be based on which edge gateway was used for ingress. Accordingly, the use of different ingress edge gateways and egress edge gateways may be a non-intentional result of using any factor(s) for determining the edge egress gateway rather than intentionally selecting different edge gateways for ingress and egress. One or more operations illustrated in FIG. 4 may be modified, rearranged, or omitted all together. Accordingly, the particular sequence of operations illustrated in FIG. 4 should not be construed as limiting the scope of one or more embodiments.

A "current packet" as referred to herein is a packet that is currently being propagated through an AS toward an edge gateway for egress out of the AS towards a destination on the Internet. Initially, the current packet is received at a particular gateway within an AS (Operation 410). The current packet includes, as a destination address, an internet address external to the AS. In an embodiment, the packet, transmitted to the particular gateway from a virtual machine, is related to and/or in response to one or more packets previously received by the virtual machine from the destination on the Internet.

The current packet is to be transmitted out of the AS using one of a set of edge gateways that are at the edge of the AS and connect the AS to the Internet (typically via NSP routers). The particular gateway selects one of the edge gateways, from the set of edge gateways, for egress of the current packet from the AS and toward the destination Internet address (Operation 412). In an embodiment, the selected edge gateway for egress of the current packet is different than an edge gateway used for ingress of one or more previous packets from the Internet address into the AS. Selection and use of an egress edge gateway that is different than the ingress edge gateway results in an asymmetric return path.

In an embodiment, a selection of an edge gateway includes selection of any edge gateway currently associated with an anycast IP address. A packet is transmitted using a DIP corresponding to the anycast IP address. One of the edge gateways currently associated with the anycast IP address (for example, the edge gateway closest to the particular gateway) becomes the selected edge gateway for transmitting the packet out of the AS. An edge gateway selected using anycasted loopback may result in an asymmetric return or a symmetric return path depending on which gateway(s) is currently associated with the anycast IP address.

In an embodiment, an ingress edge gateway is identified which was used for ingress of previous packets from the Internet address into the AS. An edge gateway, that is specifically different than the ingress edge gateway, is selected as an egress edge gateway to ensure an asymmetric return path.

In an embodiment, an edge gateway for egress is selected to improve a load balance across various edge gateways. The load at each edge gateway is determined and a particular edge gateway with a load lower than at least one other edge gateway is selected for egress of the current packet. The load may be determined, for example, based on the amount of data received by the edge gateway, the amount of data transmitted by the edge gateway, the utilization level of a processor executing the edge gateway, or any other suitable indicator of load.

In an embodiment, the edge gateway is selected based on errors associated with each of the edge gateways. In an example, an edge gateway with a lowest number of dropped packet errors within the last x seconds is selected as an edge gateway.

In an embodiment, the edge gateway is selected based on characteristics of the packet. In an example, a priority of the packet is determined. If the priority is above a threshold value, an edge gateway with a higher processing power, a lower error rate, or otherwise better performance than other edge gateways is selected for egress of the packet out of the AS.

For transmission to the selected edge gateway (or to an anycast IP address), the current packet is encapsulated to obtain an encapsulated current packet. The encapsulated current packet is transmitted from the particular gateway to the selected edge gateway via an underlay network (Operation 414). Operation 414 is substantially similar to Operation 330 in FIG. 3C.

In an embodiment, encapsulating the current packet for transmission to the selected edge gateway includes identifying the selected edge gateway as a destination address of the outer header in the encapsulated current packet. The destination address of the outer header in the encapsulated current packet may correspond to an IP address being used for anycasted loopback routing. For anycasted loopback routing the encapsulated current packet is transmitted to any edge gateway currently associated with the anycast IP address being used for anycasted loopback routing. An edge gateway currently associated with the anycast IP address is referred to herein as the selected edge gateway.

Identifying the selected edge gateway as the destination address for the encapsulated current packet advantageously simplifies routing of the encapsulated current packet. Specifically, intermediate nodes in the underlay network between the particular gateway and the selected edge gateway only need to determine a next hop toward to selected edge gateway. Determining a next hop toward the edge gateway within the same AS does not require Internet routing tables as would be needed if the packet was to be routed toward an Internet address. By removing the need to route to Internet addresses (and accordingly, the need to maintain/use Internet routing tables), the routers used within the underlay network may be implemented as local commodity routers instead of expensive Internet routers.

In an embodiment, the encapsulated current packet transmitted by the particular gateway is received and decapsulated, by the selected edge gateway to obtain the current packet (Operation 416). The current packet is then transmitted out of the AS by the selected edge gateway toward the Internet destination address using Internet routing tables (Operation 418). Operation 416 and Operation 418 are substantially similar to Operation 332 and Operation 334, respectively, of FIG. 3C.

In an embodiment, a specific logical peer is selected for transmitting the packet out of the AS. In an example, a selected logical peer is a specific NSP or a specific NSP router. When a NSP is specified, the selected edge gateway transmits the current packet to any of the routers corresponding to a specified NSP. When a NSP router is specified, the selected edge gateway transmits the current packet to the specified NSP router.

6. Redirecting Packets in an Autonomous System to an Egress Gateway

Figure 5:
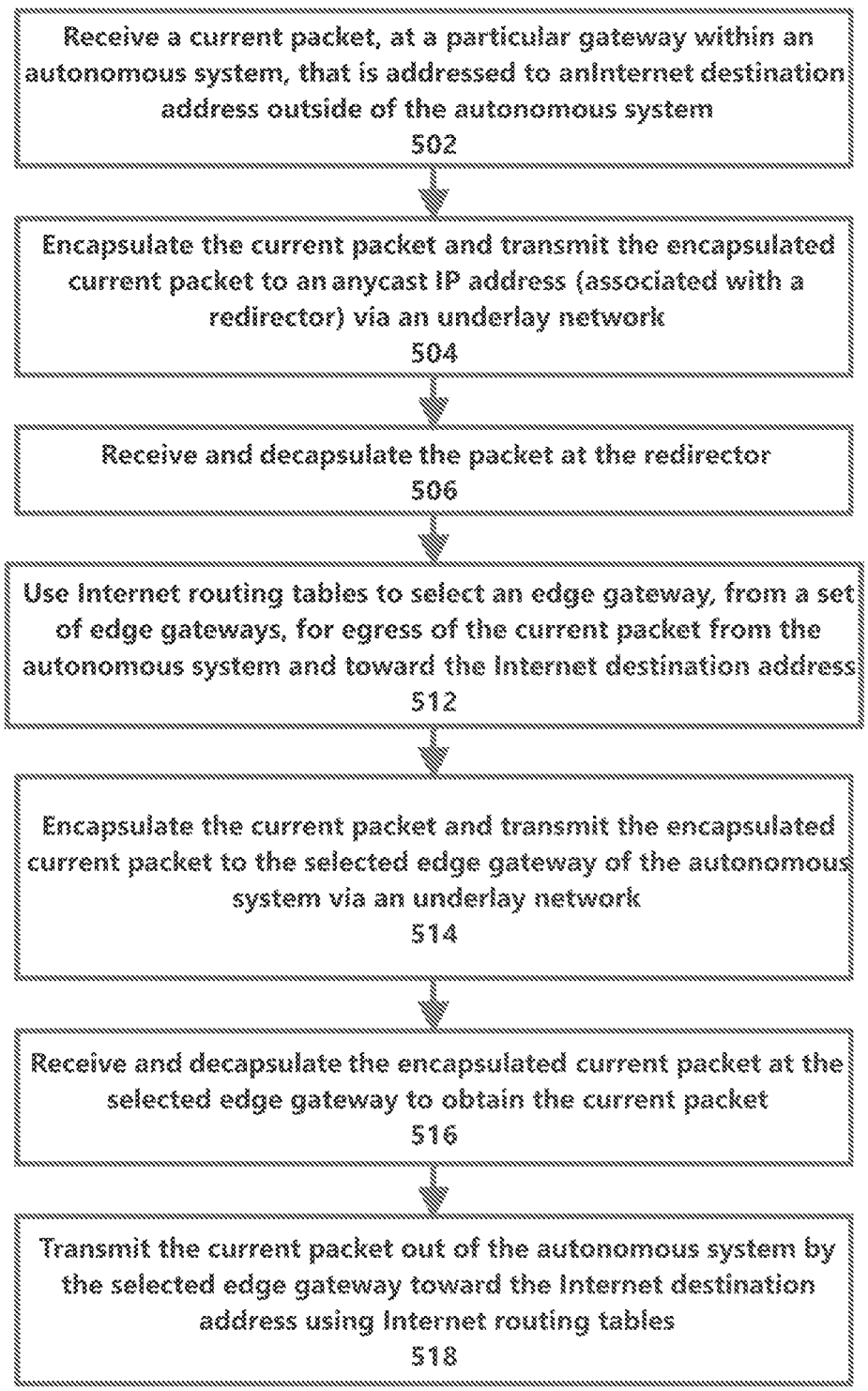

FIG. 5 illustrates an example set of operations for redirecting packets in an AS to an egress gateway in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments.

Initially, a current packet is received at a particular gateway within an AS (Operation 410). The current packet may be received by the particular gateway from a virtual machine. The current packet includes, as a destination address, an Internet address external to the AS. Receiving the current packet by the particular gateway may be substantially similar to receiving a response packet as described above with reference to Operation 322 and Operation 410. The current packet may be related to or responsive to a packet previously received by the virtual machine.

In at least one embodiment, the particular gateway does not store Internet routing tables to select a next hop for the current packet based on the Internet address included in the current packet. Accordingly, the current packet must be transmitted directly or indirectly to another device that stores Internet routing tables to route the packet to the Internet address.

In one embodiment, the particular gateway is configured to transmit packets, targeted for Internet addresses outside of the AS, to a particular destination address that is an anycast IP address. In order to transmit the current packet, the particular gateway encapsulates the current packet inside of an outer packet to obtain an encapsulated current packet with a destination address corresponding to the anycast IP address. The encapsulated current packet is then transmitted to the anycast IP address via the underlay network (Operation 504). The anycast IP address is currently associated with a redirector within the AS. As a result, the encapsulated current packet is routed to the redirector within the AS. In another embodiment, the particular gateway is configured to transmit the encapsulated current packet to a specific redirector using an IP address corresponding specifically to the redirector.

Encapsulation of the packet hides the Internet address of the inner packet from any intermediate devices (for example, within the underlay network) between the particular gateway and the redirector. Accordingly, the intermediate devices only require functionality to route the packet to the redirector within the AS. While the intermediate devices may store Internet routing tables in some embodiments; advantageously, the Internet routing tables are not required to transmit the encapsulated current packet from the particular gateway to the redirector. Accordingly, in at least one embodiment, the intermediate devices do not store Internet routing tables. The intermediate devices in the underlay network may be implemented as local commodity routers instead of expensive Internet routers.

The encapsulated current packet, transmitted by the particular gateway via the underlay network, is received and decapsulated by the redirector to obtain the current packet (Operation 506). Decapsulation is described above in detail with reference to FIG. 2.

The redirector determines the Internet address, identified as a destination address of the current packet, for selecting a next hop for the current packet. In an embodiment, the redirector selects an edge gateway, from the available set of edge gateways, as the next hop. The edge gateway is selected as an egress point for transmitting the current packet out of the AS (Operation 512).

In an embodiment, an egress gateway is selected based on the locally or remotely stored data routing policies. The redirector queries data routing policies with characteristics of the current packet (e.g., a final destination, a source device, a source entity, an associated tenant or business entity, a priority, required processing, and a security/confidentiality level). The data routing policies map the packet characteristic(s) to a logical peer of the AS. Accordingly, querying the data routing policies results in identification of a logical peer. The identified logical peer is selected as a first intermediate destination for transmission of the current packet from the AS to the final destination. In order to transmit the current packet to the selected logical peer, the redirector identifies the edge gateway of the AS that is connected to the selected logical peer. Identifying the edge gateway connected to the selected logical peer includes querying the data routing policies or querying another source of information with a mapping between edge gateways of the AS and the logical peers of the AS to which the edge gateways are connected. The edge gateway, connected to the selected logical peer, is selected as an egress point for transmitting the current packet out of the AS. In another example, the packet characteristics are mapped directly to at least one egress gateway (skipping the intermediate step of mapping to a logical peer). In this example, executing a query based on the characteristics of the current packet results in the identification of an edge gateway. The edge gateway is then selected as the egress point for transmitting the current packet out of the AS.

In an embodiment, an egress gateway is selected based on the locally or remotely stored Internet routing tables. In one example, the redirector queries Internet routing tables using the destination Internet address of the current packet to identify a route (or a portion thereof) toward the destination Internet address. In an example, the redirector queries the Internet routing tables to identify a set of one or more devices on a route toward the destination Internet address. The redirector compares the set of devices on the route to a set of edge gateways of the AS to identify an edge gateway that on the route toward the destination Internet address. The edge gateway, on the route toward the destination Internet address, is selected as an egress point for transmitting the current packet out of the AS.

In an embodiment, an egress gateway is selected based on the locally or remotely stored egress gateway mapping data. Selecting an egress gateway based on egress gateway mapping data is described above with reference to Operation 324 of FIG. 3C.

In another example, the redirector selects an IP address corresponding to anycast routing for transmitting the re-capsulated current packet to an edge gateway. In other examples, the redirector selects the edge gateway for egress of the current packet based on one or more of: a load at the edge gateways, error rate at the edge gateways, and packet characteristics as described above with reference to Operation 412 of FIG. 4.

In an embodiment, the redirector re-encapsulates the current packet and transmits the re-encapsulated current packet to the selected edge gateway via an underlay network (Operation 514). The re-encapsulated current packet may include metadata identifying a logical peer as a next hop from the selected edge gateway. Devices within the underlay network route the re-encapsulated current packet to the selected edge gateway.

The selected edge gateway receives and decapsulates the re-encapsulated current packet to obtain the current packet (Operation 516). Based on the Internet address indicated as a destination address in the current packet, the selected edge gateway determines the next hop for the current packet toward the Internet address. In one example, the selected edge gateway transmits the current packet to a logical peer specified in metadata associated with the current packet. Finally, the selected edge gateway transmits the current packet out of the AS toward the Internet address (Operation 518). Operations 516 and 518 are substantially similar to operations 416 and 418, respectively, as illustrated in FIG. 4.

7. Example Embodiments

Detailed examples are described below for purposes of clarity. Components and/or operations described below should be understood as specifics example which may not be applicable to certain embodiments. Accordingly, components and/or operations described below should not be construed as limiting the scope of any of the claims.

Figure 6A:
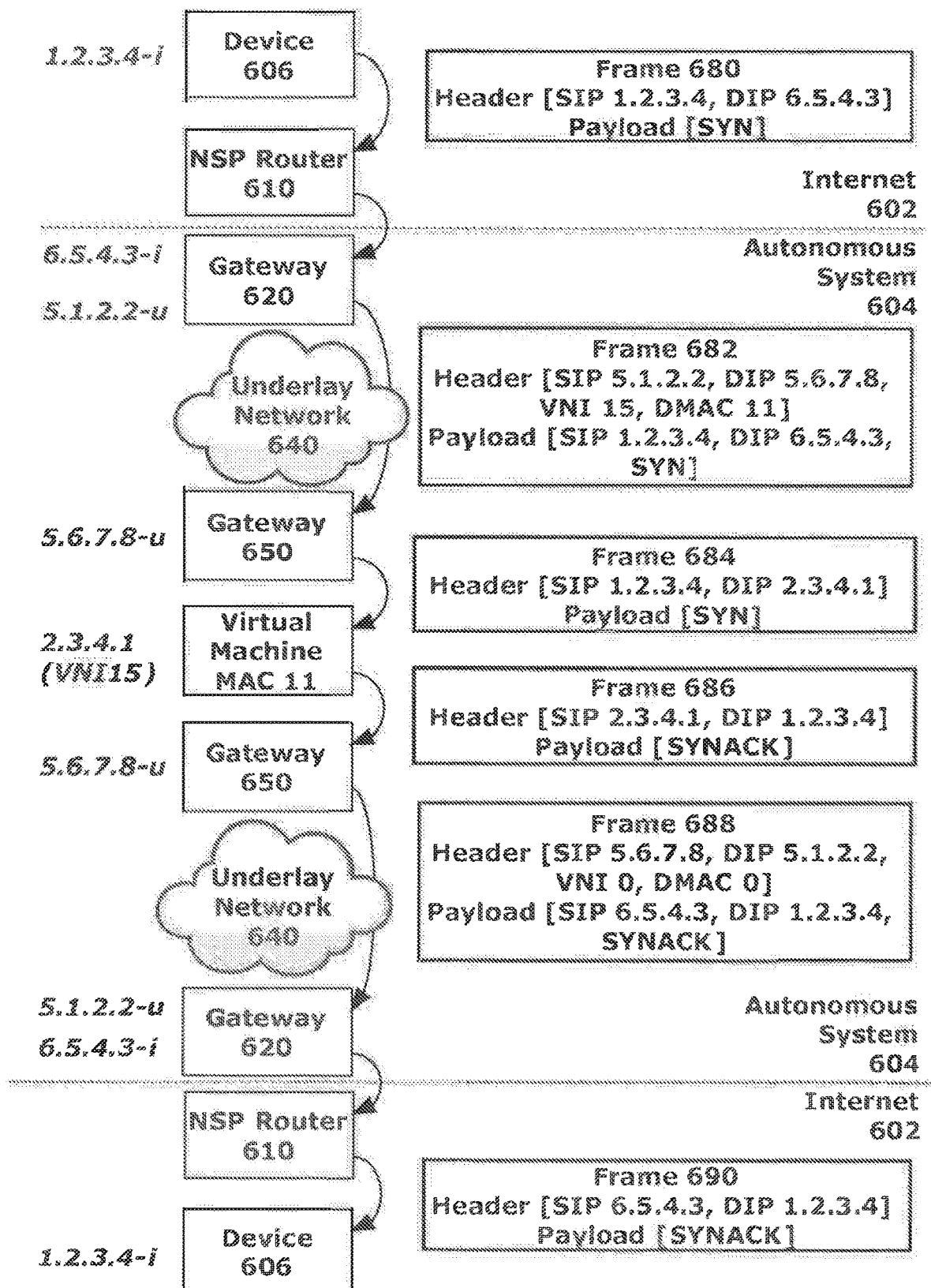
FIGS. 6A-6C illustrate various examples in accordance with one or more embodiments.

FIG. 6A illustrates a first example set of operations for forcing a symmetric return path in an AS in accordance with one or more embodiments. In this example, a SYN packet, transmitted from a device on the Internet, reaches a particular edge gateway as an ingress point for an AS. A responsive SYNACK packet is transmitted back using the same particular edge gateway as an egress point for leaving the AS. Using a particular edge gateway, which was previously used for ingress, for egress is referred to as forcing a symmetric return path.

In FIG. 6A, a single device may be illustrated multiple times for purposes of explanation. For example, the illustration of device 606 on top of FIG. 6A and the illustration of device 606 at the bottom of FIG. 6A refer to the same device, device 606.

In this example, device 606 is a device on the Internet 602 that communicates with devices within AS 604 through NSP router 610. Device 606 is identified by the IP address 1.2.3.4 (the "-i" is added in the illustration to indicate for purposes of explanation that the IP address corresponds to an internet address; a "-u" is added in the illustration to indicate that the IP address corresponds to an underlay network address).

Device 606 transmits a SYN packet as frame 680 which has a SIP address 1.2.3.4 and a DIP address 6.5.4.3. The frame 680 is routed on the Internet based on the DIP address 6.5.4.3 and eventually reaches NSP router 610 which is communicatively coupled to gateway 620 in AS 604. Gateway 620 is assigned IP address 6.5.4.3 as a public IP address. The NSP router 610 forwards frame 680 to gateway 620.

Gateway 620 receives the SYN packet as frame 680 from NSP router 610. Gateway 620 is one of the edge gateways of AS 604 that communicates with devices outside of AS 604 such as NSP router 610. Being the first device within AS 604 that receives frame 680, gateway 620 is referred to herein as an ingress point or ingress gateway for communication from device 606.

Gateway 620 further determines that the packet corresponds to a virtual machine identified by MAC 11 and located on a virtual network identified by Virtual Network Identifier (VNI) 15. Gateway 620 identifies the virtual machine identifier and virtual network identifier based on one or more pieces of information included in the packet. In this particular illustrated example, gateway 620 determines that SIP 1.2.3.4 corresponds to a tenant associated with VNI15 and further determines that port number (not illustrated) in the packet corresponds to MAC 11.

In an embodiment, VNI=15 and MAC=11 is obtained from a table that has a list of tenant's VNIs and associated assigned VNICs. A VNIC is a virtualized Network Interface Card, used by a Virtual Machine as its network interface. A VNIC is assigned a MAC address. This table may be included in a controller orchestrator module in a cloud environment such as Oracle's Public Cloud.

Gateway 620 also determines that MAC 11 on VNI15 is reachable via gateway 650 corresponding to IP address 5.6.7.8. Gateway 620 then encapsulates frame 680 within frame 682 (the encapsulated frame). As illustrated, frame 680 is stored within the payload of frame 682. Frame 682 is to be transmitted from gateway 620 to gateway 650 via under network 640. Accordingly, the header of frame 682 is generated to include SIP 5.1.2.2 (private IP address of gateway 620) and DIP 5.6.7.8 (private IP address of gateway 650). Furthermore, the header of frame 682 identifies the target on the virtual network, the virtual machine corresponding to MAC 11 on VNI 15.

Based on the header of the encapsulated frame 682, the encapsulated frame 682 is routed from gateway 620 through the underlay network 640 to Gateway 650. Gateway 650 checks for the reachability of the virtual machine MAC 11 on VNI 15 and determines that the virtual machine can be reached from gateway 650. Gateway 650 decapsulates frame 682 by removing the header to obtain the inner frame 680 corresponding to the SYN packet.

Gateway 650 modifies the DIP indicated in frame 680 to the IP address of the virtual machine MAC 11 on VNI 15 to generate frame 684. Frame 684 includes the original SIP 1.2.3.4 corresponding to device 606 on the Internet 602. The gateway 650 then transmits or delivers frame 684 to virtual machine MAC 11 on VNI 15. Furthermore, the gateway 650 updates egress gateway mapping data stored at gateway 650 which maps device 606 to gateway 620. Specifically, the egress gateway mapping data is updated to map Internet IP address 1.2.3.4 (corresponding to device 606) to private IP address 5.1.2.2 (corresponding to gateway 620). The mapping indicates that data addressed to Internet IP address 1.2.3.4 should be sent to private IP address 5.1.2.2.

Upon receiving frame 684, virtual machine MAC 11 on VNI 15 generates a SYNACK packet as frame 686. Frame 686 includes SIP 2.3.4.1 (corresponding to the virtual machine MAC 11 on VNI 15) and DIP 1.2.3.4 (corresponding to device 606 on Internet 602). Virtual machine MAC 11 on VNI 15 is unaware of the encapsulation/decapsulation process within AS 604. Virtual machine MAC 11 on VNI 15 then transmits the frame 686 to gateway 650.

Gateway 650 receives frame 686 from virtual machine MAC 11 on VNI 15. Gateway 650 modifies the SIP of frame 686 to 6.5.4.3 which is the public address of gateway 620 used as an identifier for devices outside of AS 604/used for receiving packets from outside of the AS 604. The modification of frame 686 by gateway 650 creates frame 690.

Gateway 650 then selects an egress gateway for transmitting frame 690 out of AS 604. Selecting an egress gateway includes querying the previously updated egress gateway mapping data to determine if the DIP of frame 690, 1.2.3.4 is mapped to any particular egress gateway. Executing the query based on the DIP 1.2.3.4 results in determining that DIP 1.2.3.4 is mapped to IP address 5.1.2.2 (the IP address of gateway 120). Accordingly, Gateway 650 selects gateway 620 as egress gateway for transmitting frame 690 out of AS 604.

Gateway 650 encapsulates frame 690 within frame 688. The encapsulated frame 688 is to be sent from gateway 650 to gateway 620 via the underlay network 640. Accordingly, the encapsulated frame 688 includes a header with SIP 5.6.7.8 (corresponding to gateway 650) and DIP 5.1.2.2 (corresponding to gateway 620). Encapsulated frame 688 further includes '0' for the VNI field and '0' for the destination MAC field to signal transmission out of AS 604.

Gateway 650 then transmits encapsulated frame 688 with inner frame 690 to gateway 620 via the underlay network 640.

Upon receipt, gateway 620 decapsulates frame 688 to obtain the inner frame 690. Gateway 620, the same edge gateway that was used for ingress of frame 680 into the AS 604, then transmits frame 690 out of AS 604 to NSP router 610. The use of gateway 620 for both ingress of packets from device 606 into the AS 604 and egress of packets from AS 604 toward device 606 creates a symmetric data path. Finally, the NSP router 610 forwards frame 690 toward device 606.

Figure 6B:
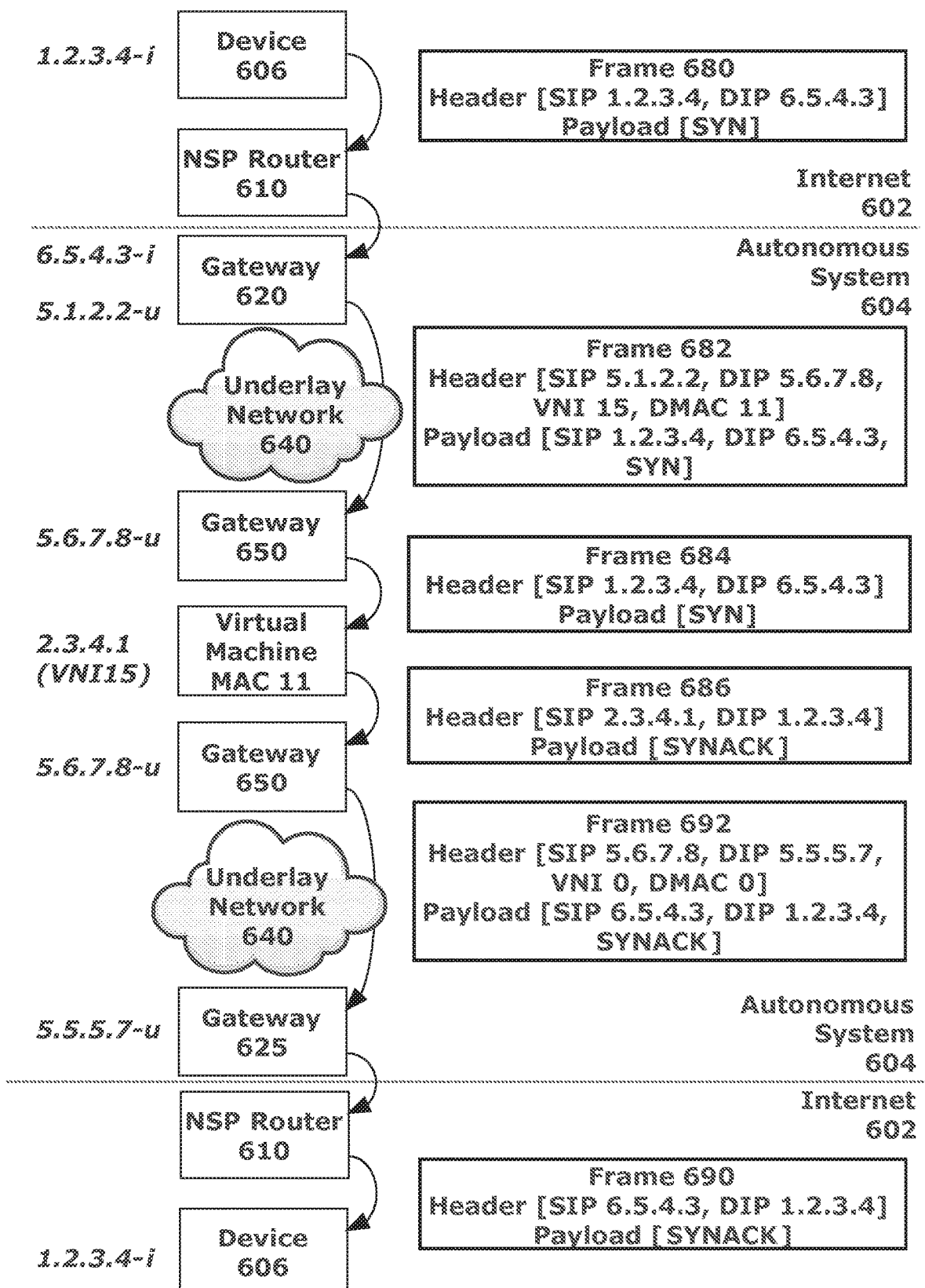

FIG. 6B illustrates a second example set of operations for selecting an asymmetric return path in an AS in accordance with one or more embodiments. In this example, a SYN packet, transmitted from a device on the Internet, reaches a particular edge gateway as an ingress point for an AS. A responsive SYNACK packet is transmitted back using a different gateway as an egress point for leaving the AS. Using a gateway for egress, that is different than a previously used gateway for ingress, is referred to as using an asymmetric return path.

The content, senders, and receivers of frames 680, 682, 684, and 686 are identical in both FIG. 6A and FIG. 6B. Accordingly, the description below, with reference to FIG. 6B, begins from the receipt of frame 686 by gateway 650, and the frames transmitted thereafter.

Referring now to FIG. 6B, Gateway 650 receives frame 686 from virtual machine MAC 11 on VNI 15. Gateway 650 modifies the SIP of frame 686 to 6.5.4.3 which is the public address of gateway 620 used as an identifier for devices outside of AS 604/used for receiving packets from outside of the AS 604. The modification of frame 686 by gateway 650 creates frame 690.

Responsive to the destination address of frame 690 being an address on the Internet outside of AS 604, Gateway 650 determines that frame 690 is to be transmitted to IP address 5.5.5.7 which is an anycast IP address. To transmit frame 690 via underlay network 640, gateway 650 encapsulates frame 690 within frame 692. The encapsulated frame 692 is to be sent from gateway 650 to DIP 5.5.5.7 via the underlay network 640. Accordingly, the encapsulated frame 692 includes a header with SIP 5.6.7.8 (corresponding to gateway 650) and DIP 5.5.5.7. Encapsulated frame 692 further includes '0' for the VNI field and '0' for the destination MAC field to signal transmission out of AS 604. Gateway 650 then transmits encapsulated frame 692 with inner frame 690 to gateway 625 via the underlay network 640.

Anycast IP address 5.5.5.7 is currently associated with gateway 625. Accordingly, encapsulated frame 692 is routed through underlay network 640 to gateway 625. Upon receipt, gateway 625 decapsulates frame 692 to obtain the inner frame 690. Gateway 625 then transmits frame 690 out of AS 604 to NSP router 610. The use of gateway 625 for egress of frame 690 toward device 606 and the use of gateway 620 for ingress of frame 680 from device 606 results in an asymmetric return path. In an alternative embodiment, gateway 625 could at least sometimes be gateway 620.

Figure 6C:
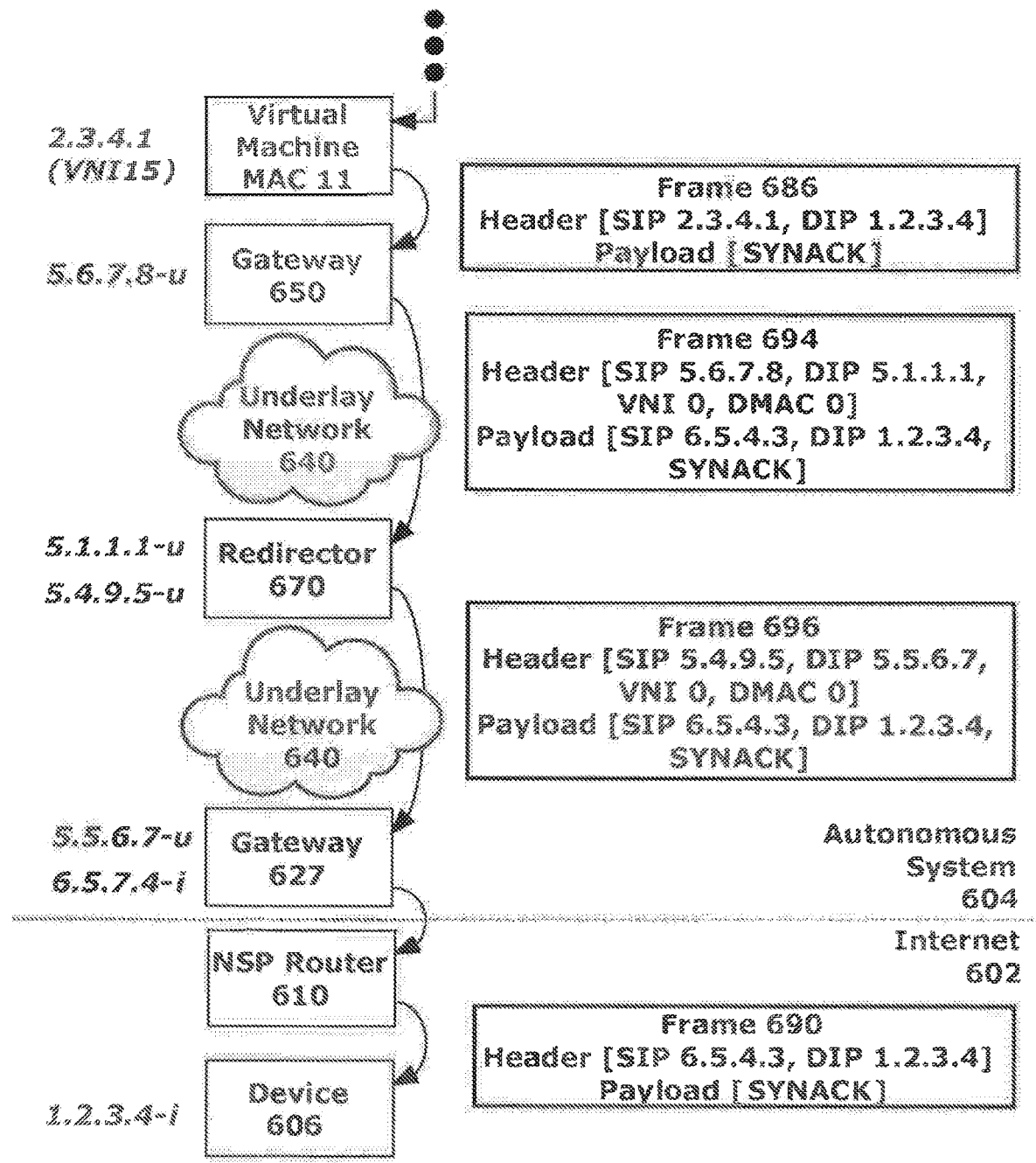

FIG. 6C illustrates a third example set of operations for redirecting packets in an autonomous system to a selected egress gateway. In this example, a SYNACK packet being transmitted out of an AS is transmitted to a redirector. The redirector forwards the SYNACK packet to an edge gateway to be used for egress of the SYNACK packet out of the AS.

Frames 680, 682, 684, and 686, as illustrated in FIGS. 6A and 6B and described above are applicable to this third example illustrated in FIG. 6C. Accordingly, the description below, with reference to FIG. 6C, describes the receipt of frame 686 by gateway 650, and the frames transmitted thereafter.

Gateway 650 receives frame 686 from virtual machine MAC 11 on VNI 15. Gateway 650 modifies the SIP of frame 686 to 6.5.4.3 which is the public address of gateway 620 used as an identifier for devices outside of AS 604/used for receiving packets from outside of the AS 604. The modification of frame 686 by gateway 650 creates frame 690.

In this third example, gateway 650 is configured to transmit frames, addressed to devices on the Internet 602, to DIP 5.1.1.1 which corresponds to an anycast loopback IP address currently associated with redirector 670. Gateway 650 encapsulates frame 690 within frame 694 for transmission through underlay network 640. The encapsulated frame 694 is to be sent from gateway 650 to DIP 5.1.1.1 via the underlay network 640. Accordingly, the encapsulated frame 694 includes a header with SIP 5.6.7.8 (corresponding to gateway 650) and DIP 5.1.1.1. Encapsulated frame 694 further includes '0' for the VNI field and '0' for the destination MAC field to signal transmission out of AS 604. Gateway 650 then transmits encapsulated frame 694 with inner frame 690 via the underlay network 640.

Based on the DIP 5.1.1.1 corresponding to an anycast loopback IP address currently associated with redirector 670, the encapsulated frame 694 is routed to redirector 670. Upon receipt, redirector 670 decapsulates frame 694 to obtain the inner frame 690.

Redirector 670 queries data routing policies using the destination address 1.2.3.4 of frame 690 to determine a next hop for frame 690. The data routing policies identify a route toward destination address 1.2.3.4 that includes gateway 627 corresponding to IP address 5.5.6.7. Redirector 670 determines that the frame 690 is to be transmitted to DIP 5.5.6.7 for forwarding out of AS 604 and toward destination address 1.2.3.4.

To transmit frame 690 via underlay network 640, redirector 670 encapsulates frame 690 within frame 696. The encapsulated frame 696 is to be sent from redirector 670 to DIP 5.5.6.7 via the underlay network 640. Accordingly, the encapsulated frame 696 includes a header with SIP 5.4.9.5 (corresponding to redirector 670) and DIP 5.5.6.7. Encapsulated frame 696 further includes '0' for the VNI field and '0' for the destination MAC field to signal transmission out of AS 604. Redirector 670 then transmits encapsulated frame 696 with inner frame 690 to via the underlay network 640.

Upon receipt, gateway 627 decapsulates frame 696 to obtain the inner frame 690. Gateway 627 then transmits frame 690 out of AS 604 to NSP router 610. Finally, the NSP router 610 forwards frame 690 toward device 606.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
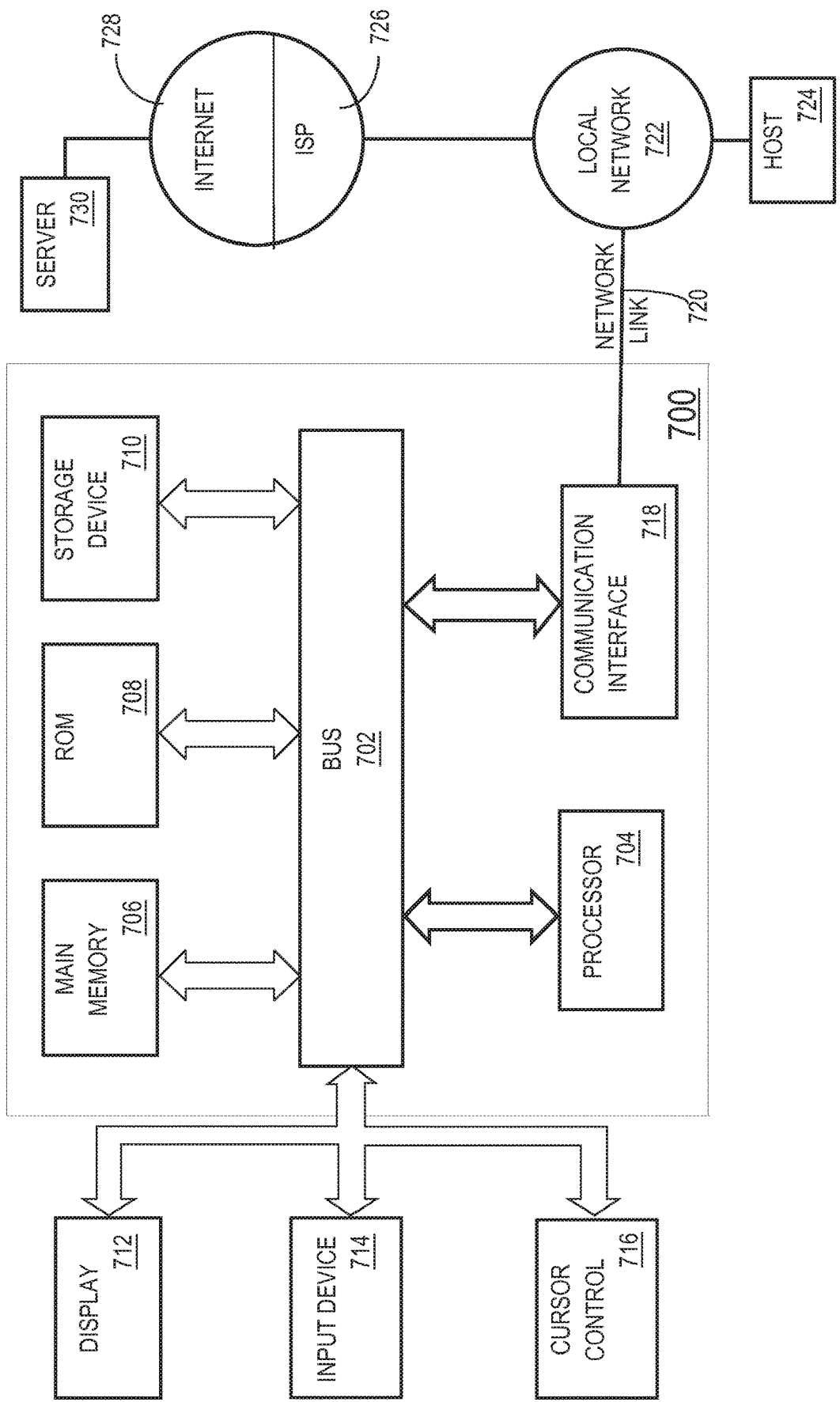
FIG. 7 illustrates a system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions, which when executed by one or more processors, cause:
   receiving, by a middlebox in an Autonomous System (AS) from a source within the AS, a first packet to be transmitted to an Internet address that is external to the AS and accessible via a plurality of egress gateways of the AS;
   determining, based on a comparison of a plurality of respective values of a processor performance metric for the plurality of egress gateways, that a first egress gateway in the plurality of egress gateways performs better than a second egress gateway in the plurality of egress gateways;
   wherein the plurality of respective values of the processor performance metric for the plurality of egress gateways comprises at least a first processor power associated with the first egress gateway and a second processor power associated with the second egress gateway, wherein determining that the first egress gateway performs better than a second egress gateway comprises determining that the first processor power is higher than the second processor power;
   based at least on determining that the first egress gateway performs better than the second egress gateway in the plurality of egress gateways: selecting, by the middlebox, the first egress gateway for transmitting the first packet out of the AS;

encapsulating, by the middlebox, the first packet within a second packet addressed to the first egress gateway;

transmitting, by the middlebox, the second packet toward the first egress gateway.

2. The one or more media of claim 1, wherein the plurality of respective values of the processor performance metric for the plurality of egress gateways comprises at least a first processor utilization level associated with the first egress gateway and a second processor utilization level associated with the second egress gateway.

3. The one or more media of claim 1, wherein the source within the AS is a virtual machine allocated to a particular tenant in a plurality of tenants of the AS.

4. One or more non-transitory machine-readable media storing instructions, which when executed by one or more processors, cause:

receiving, by a middlebox in an Autonomous System (AS) from a source within the AS, a first packet to be transmitted to an Internet address that is external to the AS and accessible via a plurality of egress gateways of the AS;

determining, based on a comparison of a plurality of respective values of a gateway performance metric for the plurality of egress gateways comprising a processor utilization level, that a first egress gateway in the plurality of egress gateways performs with a lower processor utilization relative to a second egress gateway in the plurality of egress gateways;

obtaining a set of one or more packet characteristics associated with the first packet;

based at least on (a) determining that the first egress gateway performs at a lower processor utilization relative to the second egress gateway in the plurality of egress gateways and (b) the set of one or more packet characteristics associated with the first packet: selecting, by the middlebox, the first egress gateway for transmitting the first packet out of the AS;

transmitting, by the middlebox, the second packet toward the first egress gateway, wherein the method is performed by at least one device including a hardware processor.

5. The one or more media of claim 4, wherein the source within the AS is a virtual machine allocated to a particular tenant in a plurality of tenants of the AS.

6. The one or more media of claim 5, wherein the set of one or more packet characteristics comprises the particular tenant.

7. The one or more media of claim 4, wherein the set of one or more packet characteristics comprises a priority level of the first packet.

8. The one or more media of claim 4, wherein the set of one or more packet characteristics comprises a confidentiality level of the first packet.

9. The one or more media of claim 4, wherein the plurality of respective values of the gateway performance metric for the plurality of egress gateways comprises processor powers associated, respectively, with the plurality of egress gateways.

10. The one or more media of claim 4, wherein the plurality of respective values of the gateway performance metric for the plurality of egress gateways comprises error rates associated, respectively, with the plurality of egress gateways.

11. The one or more media of claim 10, wherein the error rates associated with the plurality of egress gateways comprise dropped packet rates.

12. The one or more media of claim 4, wherein selecting the first egress gateway is further based on the first egress gateway being different than an ingress gateway that received a third packet originating at the Internet address.

13. The one or more media of claim 4, wherein the middlebox receives the first packet from the source within the AS via another device within the AS.

14. The one or more media of claim 4, wherein the middlebox transmits the second packet toward the first egress gateway via an intermediate device in the AS.

15. The one or more media of claim 4, wherein the comparison of the plurality of respective values of the gateway performance metric indicates that the first egress gateway performs better than any other egress gateway in the plurality of egress gateways.

16. A system comprising:

at least one device including a hardware processor;

the system being configured to perform operations comprising:

receiving, by a middlebox in an Autonomous System (AS) from a source within the AS, a first packet to be transmitted to an Internet address that is external to the AS and accessible via a plurality of egress gateways of the AS;

determining, based on a comparison of a plurality of respective values of a gateway performance metric for the plurality of egress gateways, that a first egress gateway in the plurality of egress gateways performs better than a second egress gateway in the plurality of egress gateways;

wherein the plurality of respective values of the gateway performance metric for the plurality of egress gateways comprises processor utilization levels associated, respectively, with the plurality of egress gateways, wherein determining that the first egress gateway performs better than the second egress gateway is based on determining that a first processor utilization level associated with the first egress gateway is lower than a second processor utilization level associated with the second egress gateway;

obtaining a set of one or more packet characteristics associated with the first packet;

based at least on (a) determining that the first egress gateway performs better than the second egress gateway in the plurality of egress gateways and (b) the set of one or more packet characteristics associated with the first packet: selecting, by the middlebox, the first egress gateway for transmitting the first packet out of the AS;

encapsulating, by the middlebox, the first packet within a second packet addressed to the first egress gateway;

transmitting, by the middlebox, the second packet toward the first egress gateway, wherein the method is performed by at least one device including a hardware processor.

17. The system of claim 16, wherein the gateway performance metric comprises a processor performance metric.

* * * * *

UNITED STATES PATENT AND TRADEMARK OFFICE
CERTIFICATE OF CORRECTION

PATENT NO. : 11,025,677 B2  
APPLICATION NO. : 16/452174  
DATED : June 1, 2021  
INVENTOR(S) : Cohn It is certified that error appears in the above-identified patent and that said Letters Patent is hereby corrected as shown below:

In the Drawings

On sheet 8 of 13, in FIGURE 4, under Reference Numeral 410, Line 2, delete "anInternet" and insert -- an Internet --, therefor.

On sheet 9 of 13, in FIGURE 5, under Reference Numeral 502, Line 2, delete "anInternet" and insert -- an Internet --, therefor.

In the Specification

In Column 2, Line 42, delete "ASSYMETRIC" and insert -- ASYMMETRIC --, therefor.

Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*